(12) United States Patent
Denbo et al.

(10) Patent No.: US 10,214,121 B2
(45) Date of Patent: Feb. 26, 2019

(54) METHOD OF ASSEMBLING A CHILD RESTRAINT HAVING A TILTABLE JUVENILE VEHICLE SEAT

(71) Applicant: Dorel Juvenile Group, Inc., Foxboro, MA (US)

(72) Inventors: Sean R. Denbo, Columbus, IN (US); Mei-Hui Lin, Nashville, IN (US); Kyle M. Franke, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 190 days.

(21) Appl. No.: 15/339,519

(22) Filed: Oct. 31, 2016

(65) Prior Publication Data

US 2017/0120782 A1 May 4, 2017

Related U.S. Application Data

(60) Provisional application No. 62/248,597, filed on Oct. 30, 2015.

(51) Int. Cl.
*B60N 2/28* (2006.01)
*B23P 19/04* (2006.01)

(52) U.S. Cl.
CPC ........... *B60N 2/2875* (2013.01); *B60N 2/286* (2013.01); *B60N 2/2821* (2013.01)

(58) Field of Classification Search
CPC ... B60N 2/2884; B60N 2/2821; B60N 2/2875
See application file for complete search history.

(56) References Cited

U.S. PATENT DOCUMENTS

| | | | |
|---|---|---|---|
| 4,816,205 A | 3/1989 | Gallix | |
| 5,746,478 A | 5/1998 | Lumley et al. | |
| 5,836,650 A | 11/1998 | Warner et al. | |
| 6,000,753 A | 12/1999 | Cone | |
| 6,139,101 A | 10/2000 | Berringer et al. | |
| 6,199,949 B1 | 3/2001 | DaSilva | |
| 6,299,249 B1 | 10/2001 | Mori | |
| 6,375,260 B1 | 4/2002 | Hiramatsu et al. | |
| 6,428,100 B1 | 8/2002 | Kain et al. | |
| 6,454,350 B1 | 9/2002 | Celestina-Krevh et al. | |
| 6,505,887 B2 | 1/2003 | Hampton | |
| 6,554,358 B2 | 4/2003 | Kain | |
| 6,572,189 B1 | 6/2003 | Blaymore | |
| 6,626,493 B2 | 9/2003 | Kain | |
| 6,908,151 B2 | 6/2005 | Meeker et al. | |
| 7,059,677 B2 | 6/2006 | Balensiefer et al. | |
| 7,472,955 B2 | 1/2009 | Crane et al. | |
| 8,579,369 B2 * | 11/2013 | Gaudreau, Jr. | B60N 2/2812 297/216.11 |
| 8,764,108 B2 * | 7/2014 | Gaudreau, Jr. | B60N 2/2812 297/250.1 |
| 8,998,318 B2 | 4/2015 | Gaudreau, Jr. | |
| 9,022,471 B2 * | 5/2015 | Gaudreau, Jr. | B60N 3/101 297/216.11 |
| 2012/0313413 A1 | 12/2012 | Hutchinson et al. | |

* cited by examiner

*Primary Examiner* — John C Hong
(74) *Attorney, Agent, or Firm* — Barnes & Thornburg LLP

(57) ABSTRACT

A method is provided for assembling a child restraint. The method includes the steps of coupling a seat-pivot-and-lock unit to a tiltable juvenile vehicle seat and coupling a seat support to the tiltable juvenile vehicle seat.

21 Claims, 13 Drawing Sheets

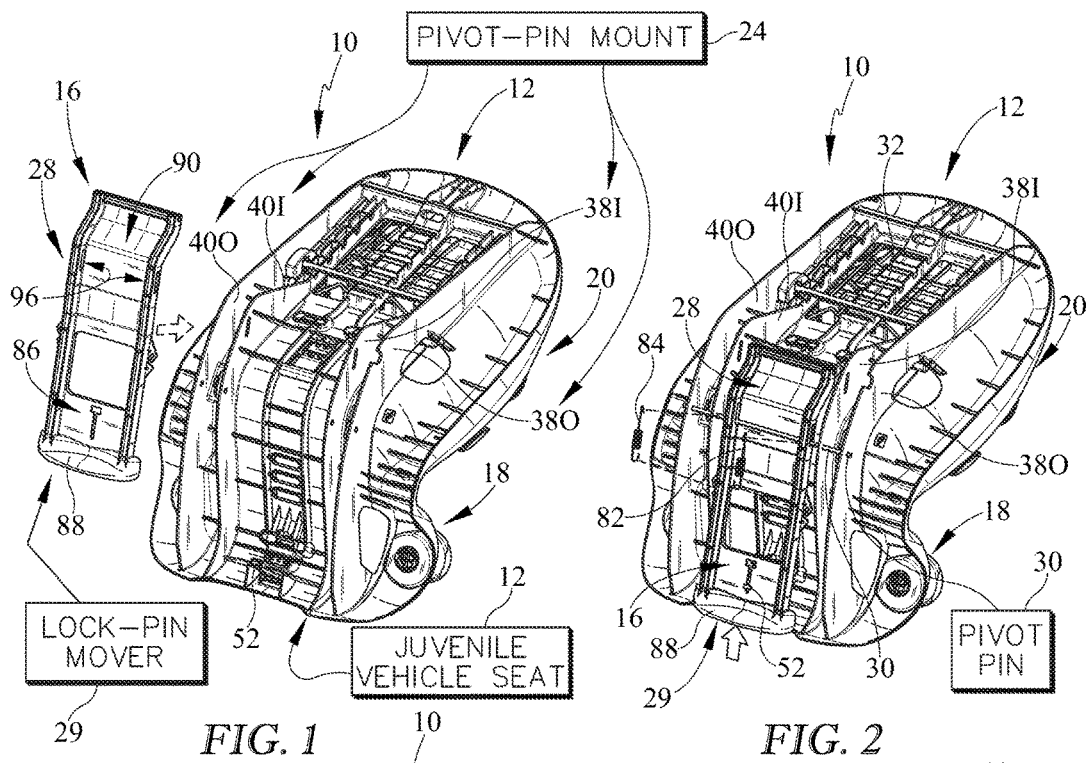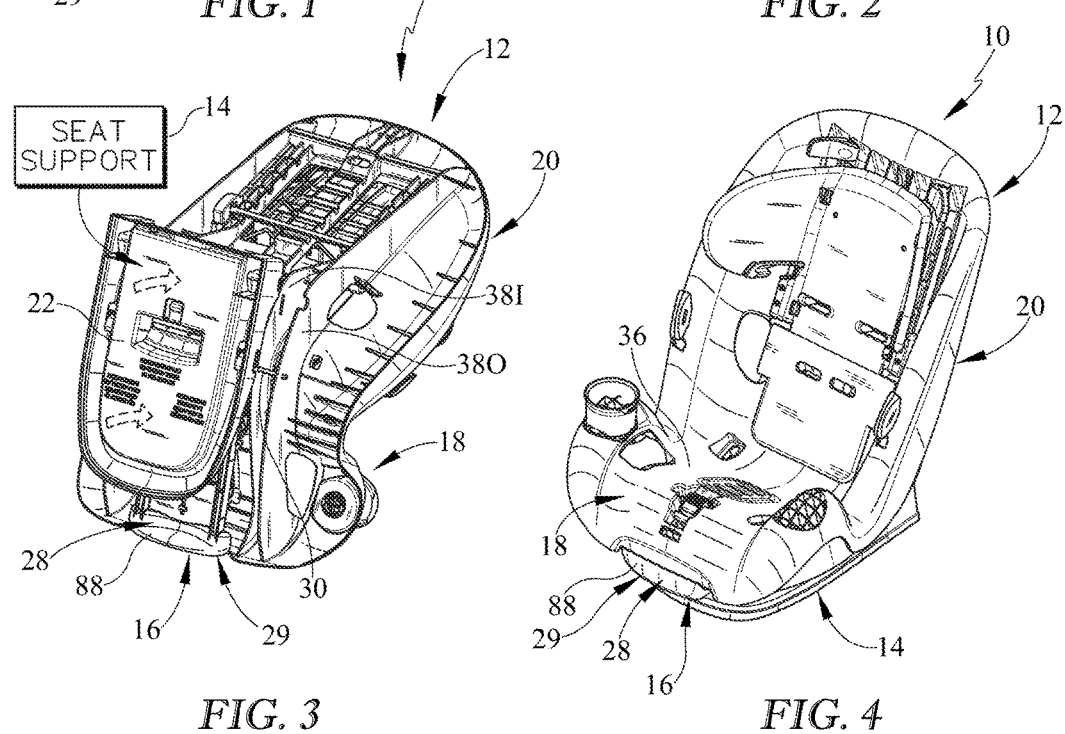

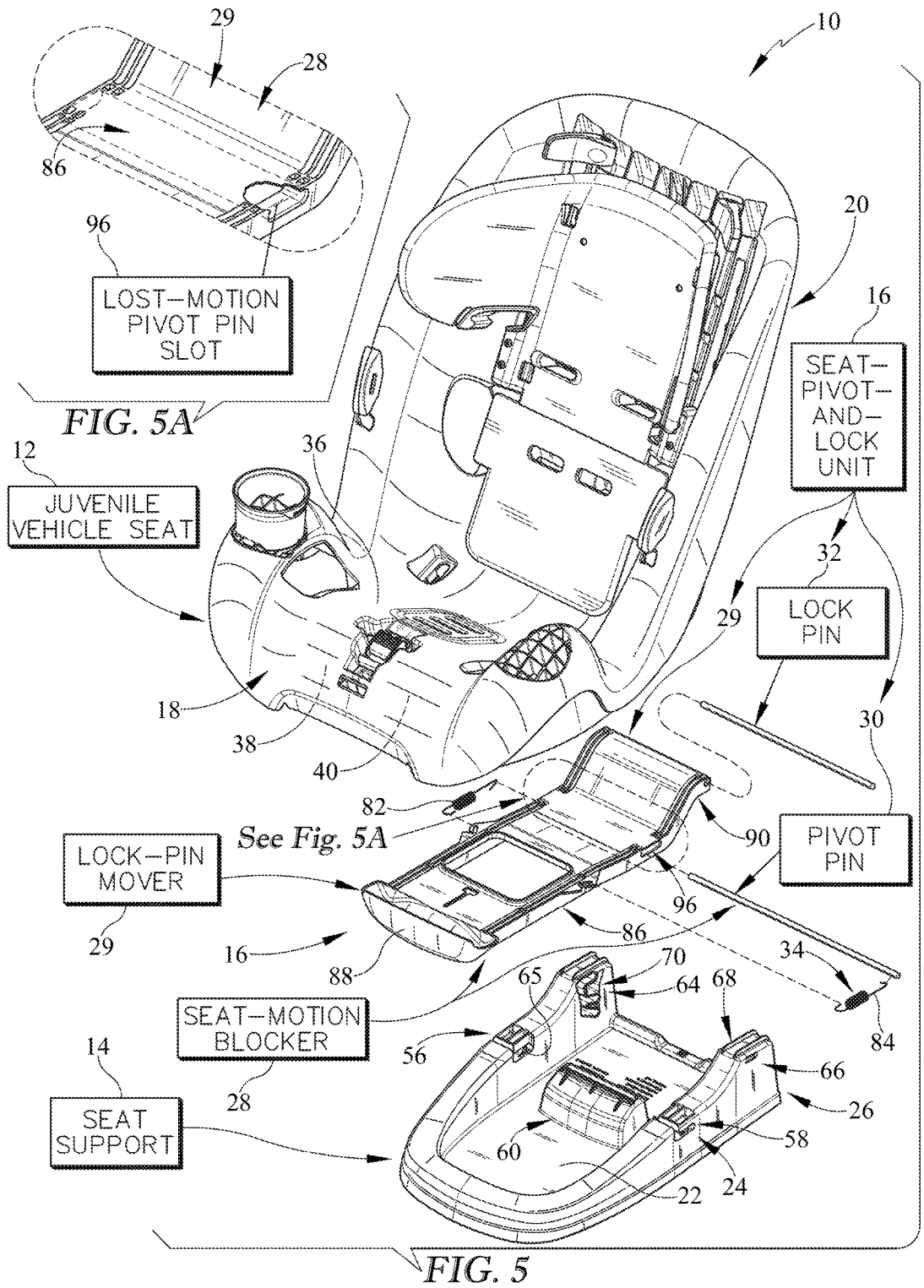

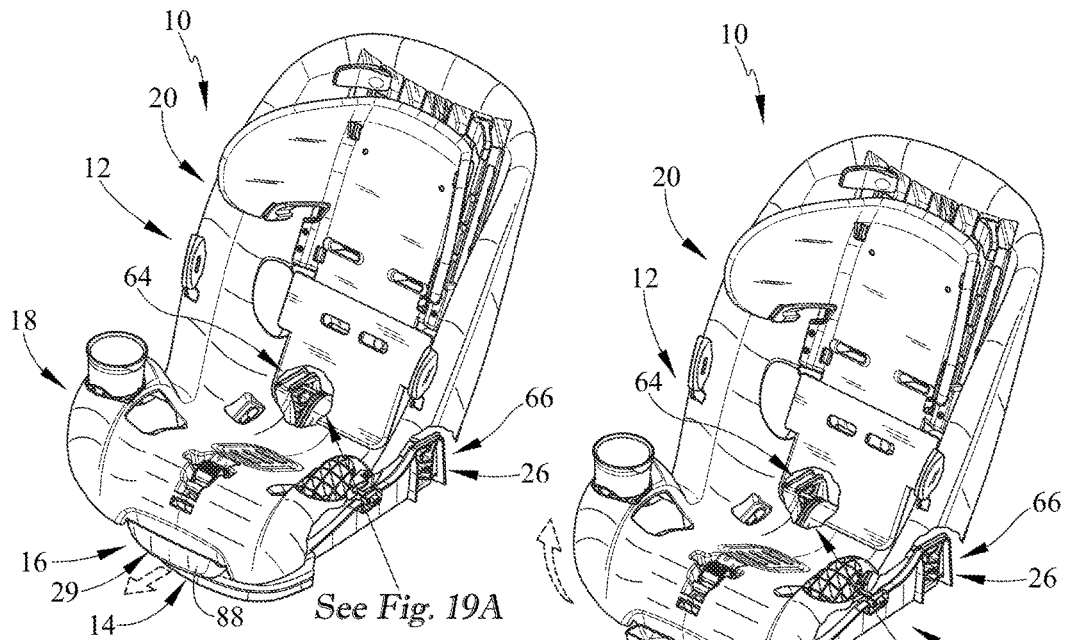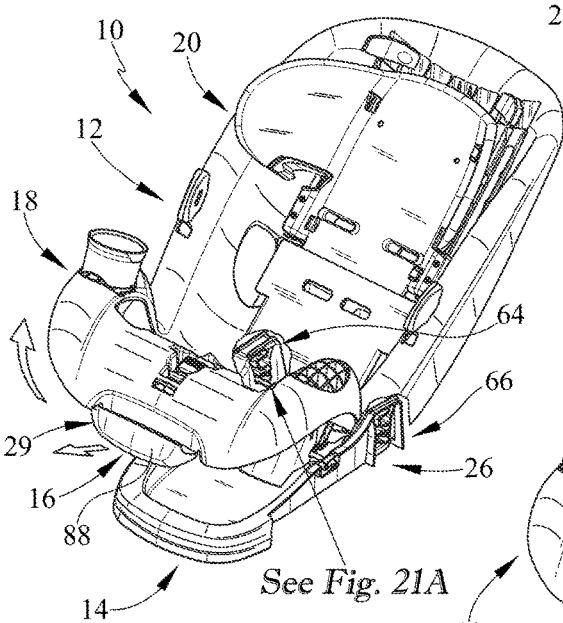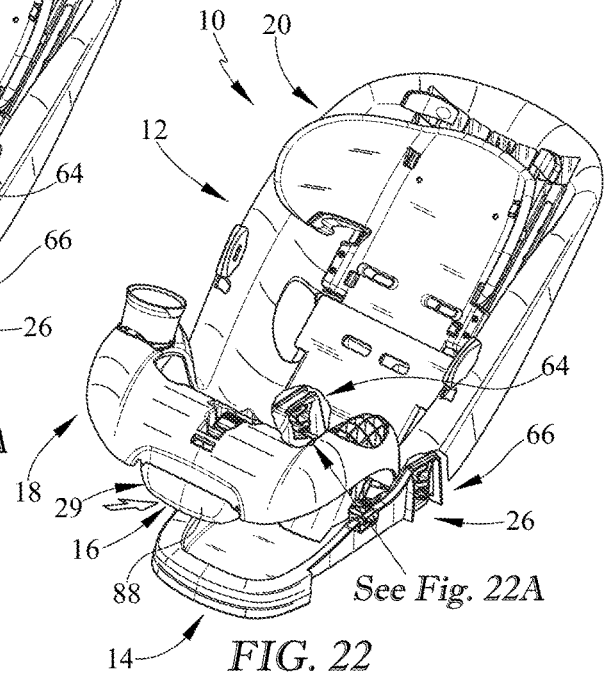

METHOD OF ASSEMBLING A CHILD RESTRAINT HAVING A TILTABLE JUVENILE VEHICLE SEAT

PRIORITY CLAIM

This application claims priority under 35 U.S.C. § 119(e) to U.S. Application No. 62/248,597 filed Oct. 30, 2015, which is expressly incorporated by reference herein.

BACKGROUND

The present disclosure relates to a child restraint, and particularly to a child restraint including a tiltable juvenile vehicle seat arranged to support a child in one or more tilt arrangements relative to a seat support underlying the tiltable juvenile vehicle seat. More particularly, the present disclosure relates to a method of assembling a child restraint including a tiltable juvenile vehicle seat and a seat support.

SUMMARY

According to the present disclosure, a child restraint includes seat support adapted to set on a passenger seat included in a vehicle and a tiltable juvenile vehicle seat coupled to the seat support. In illustrative embodiments, the tiltable juvenile vehicle seat can be pivoted about a seat-pivot axis established by a pivot pin relative to the seat support between an upright position and at least one tilt position once a caregiver grips and pulls on a spring-loaded seat-motion blocker to move the seat-motion blocker relative to the juvenile vehicle seat from an extended seat-anchoring position engaging the seat support to a retracted seat-tilting position disengaging the seat support.

A seat-pivot-and-lock unit is included in the child restraint and used to support the juvenile vehicle seat for pivotable movement relative to the seat support about the seat-pivot axis and to lock the juvenile vehicle seat in a selected upright or tilted orientation relative to the seat support. The seat-pivot-and-lock unit includes a slidable seat-motion blocker, a pivot pin, and biasing springs.

In illustrative embodiments, the seat-motion blocker includes a lock-pin mover that is mounted for sliding movement relative to the underside of the juvenile vehicle seat on a pivot pin that is coupled to the juvenile vehicle seat between an extended seat-anchoring position and a retracted seat-tilting position. The seat-motion blocker also includes a grip handle at one end of the lock-pin mover and a lock pin coupled to an opposite end of the lock-pin mover to move therewith relative to the juvenile vehicle seat under the control of a caregiver.

In the extended seat-anchoring position, the lock pin included in the seat-motion blocker and coupled to the lock-pin mover to slide therewith is extended into one of several pin-receiver channel sections formed in the seat support. A first pin-receiver channel section is associated with an upright orientation of the juvenile vehicle seat. Other pin-receiver channel sections are associated with various tilted orientations of the juvenile vehicle seat relative to the seat support.

A lock-pin transfer channel communicating with each pin-receiver channel section is provided in the seat support to allow movement of the lock pin from one pin-receiver channel section to another via the lock-pin transfer channel during a change in the orientation of the juvenile vehicle seat relative to the seat support when a caregiver grips a handle included in the lock-pin mover and moves the lock-pin mover relative to the juvenile vehicle seat against a biasing force provided by the springs to the retracted seat-tilting position to withdraw the lock pin from one of the pin-receiver channel sections formed in the seat support and move it into the lock-pin transfer channel also formed in the seat support so that the juvenile vehicle seat can be pivoted on the pivot pin to move relative to the seat support between the upright orientation and each of the tilted orientations.

In illustrative embodiments, a mover-biasing spring included in the seat-pivot-and-lock unit is coupled to the tiltable juvenile vehicle seat and to the lock-pin mover before the juvenile vehicle seat is mounted for pivotable movement on the underlying seat support using the pivot pin. The mover-biasing spring is configured to provide means for normally and yieldably urging the lock-pin mover to the extended seat-anchoring position so that the lock pin carried on the lock-pin mover is moved automatically by the mover-biasing spring from the lock-pin transfer channel formed in the seat support into one of the pin-receiver channel sections formed in the seat support when the lock pin is aligned with such a pin-receiver channel section and the caregiver releases the handle of the spring-loaded lock-pin mover.

In an illustrative child restraint assembly method in accordance with the present disclosure, mover-biasing springs are installed before the juvenile vehicle seat is pivotably coupled to the seat support. The method comprises the steps of mounting the lock-pin mover of the seat-motion blocker for sliding movement on the underside of the juvenile vehicle seat, then coupling a mover-biasing spring to the pivot pin and to the lock-pin mover to move the lock-pin mover relative to the juvenile vehicle seat normally to the extended seat-anchoring position, and the finally coupling the pivot pin to the seat support and to the juvenile vehicle seat and the seat-motion blocker so that the juvenile vehicle seat and the seat-motion blocker are supported for pivotable movement as a unit about the seat-pivot axis relative to the seat support when the lock-pin mover is in the retracted seat-tilting position and the lock pin is in the lock-pin transfer channel formed in the seat support. In illustrative embodiments, the pivot pin coupling step comprises the step of snapping a portion of the pivot pin into a snap connector included in the seat support and arranged to face toward the juvenile vehicle seat.

In an illustrative method in accordance with the present disclosure, the mover-biasing spring is coupled to the juvenile vehicle seat and to the seat-motion blocker before the juvenile vehicle seat is coupled for pivotable movement to the underlying seat support. This assembly sequence in accordance with the present disclosure allows an assembly technician to complete a visual inspection of the installed mover-biasing spring to confirm that such installation is proper before the juvenile vehicle seat is mounted on the seat support. Once the seat support is mounted on the juvenile vehicle seat, the mover-biasing spring is hidden from view so a visual inspection of spring installation could not be made.

In illustrative embodiments, a method is provided for assembling a child restraint including a tiltable juvenile vehicle seat, a seat support, and a seat-pivot-and-lock unit. In illustrative embodiments, a method of assembling the child restraint includes aligning a lost-motion pivot pin slot formed in a seat-pivot-and-lock unit with a pivot-pin receiving aperture formed in a rib included in a tiltable juvenile vehicle seat, inserting a pivot pin through the pivot-pin receiving aperture and the lost-motion pivot pin slot to couple the seat-pivot-and-lock unit to the tiltable juvenile vehicle seat, coupling a first spring between the pivot pin and a retainer finger included in the seat-pivot-and-lock unit to bias the seat-pivot-and-lock unit toward a retracted position in which a retracted end of the lost-motion pivot pin slot engages the pivot pin, moving a seat support relative to the tiltable juvenile vehicle seat to cause a pivot mount included in the seat support to receive the pivot pin to pivotably couple the seat support to the tiltable juvenile vehicle seat and to the seat-pivot-and-lock unit, and inserting a lock pin through a lock-pin receiving slot formed in the rib included in the tiltable juvenile vehicle seat, a lock mount included in the seat support, and a lock body included in the seat-pivot-and-lock unit to couple the tiltable juvenile vehicle seat to the seat support and to block selectively movement of the tiltable juvenile vehicle seat relative to the seat support to retain the tiltable juvenile vehicle seat in one of an upright arrangement and one of two tilt arrangements.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1 through 4 are a series of views showing a child restraint including a tiltable juvenile vehicle seat, a seat support, and a seat-pivot-and-lock unit configured to include a slidable seat-motion blocker, a pivot pin, and blocker-biasing springs and arranged to control relative movement between the tiltable juvenile vehicle seat and the seat support and suggesting that the blocker-biasing springs can be coupled to the pivot pin and to the slidable seat-motion blocker before the juvenile vehicle seat is pivotably mounted on the seat support so that an assembler can visually inspect the seat-pivot-and-lock unit and determine whether the blocker-biasing springs included in the seat-pivot-and-lock unit are properly installed before coupling the seat support to the tiltable juvenile vehicle seat, which coupling blocks the assembler's ability to inspect visually the installation of the blocker-biasing springs of the seat-pivot-and-lock unit;

FIG. 1 is a perspective view of the child restraint showing an underside of the tiltable juvenile vehicle seat and a lock-pin mover of a seat-motion blocker included in the seat-pivot-and-lock unit that is spaced apart from the tiltable juvenile vehicle seat and suggesting that the lock-pin mover of the seat-motion blocker is coupled to the underside of the tiltable juvenile vehicle seat before being coupled to the blocker-biasing springs and the seat support;

FIG. 2 is a view similar to FIG. 1 showing that the lock-pin mover has been coupled to first and second ribs included in the tiltable juvenile vehicle seat by a pivot pin that extends through the ribs of the tiltable juvenile vehicle seat and slots formed in the lock-pin mover and that the two springs included in the seat-pivot-and-lock unit are spaced apart from the tiltable juvenile vehicle seat and suggesting that each spring can be coupled to the pivot pin and to the lock-pin mover of the seat-motion blocker so that the springs can be visually inspected for proper installation before the seat support is coupled to the tiltable juvenile vehicle seat which may block the ability to inspect the springs visually;

FIG. 3 is a view similar to FIG. 2 showing the child restraint after the seat-motion blocker and the springs have been coupled to the tiltable juvenile vehicle seat and suggesting that the seat support can be coupled to the tiltable juvenile vehicle seat after the springs have been installed properly and inspected visually;

FIG. 4 is a perspective view of the child restraint of FIG. 3 showing the child restraint after it has been fully assembled;

Figure 6:
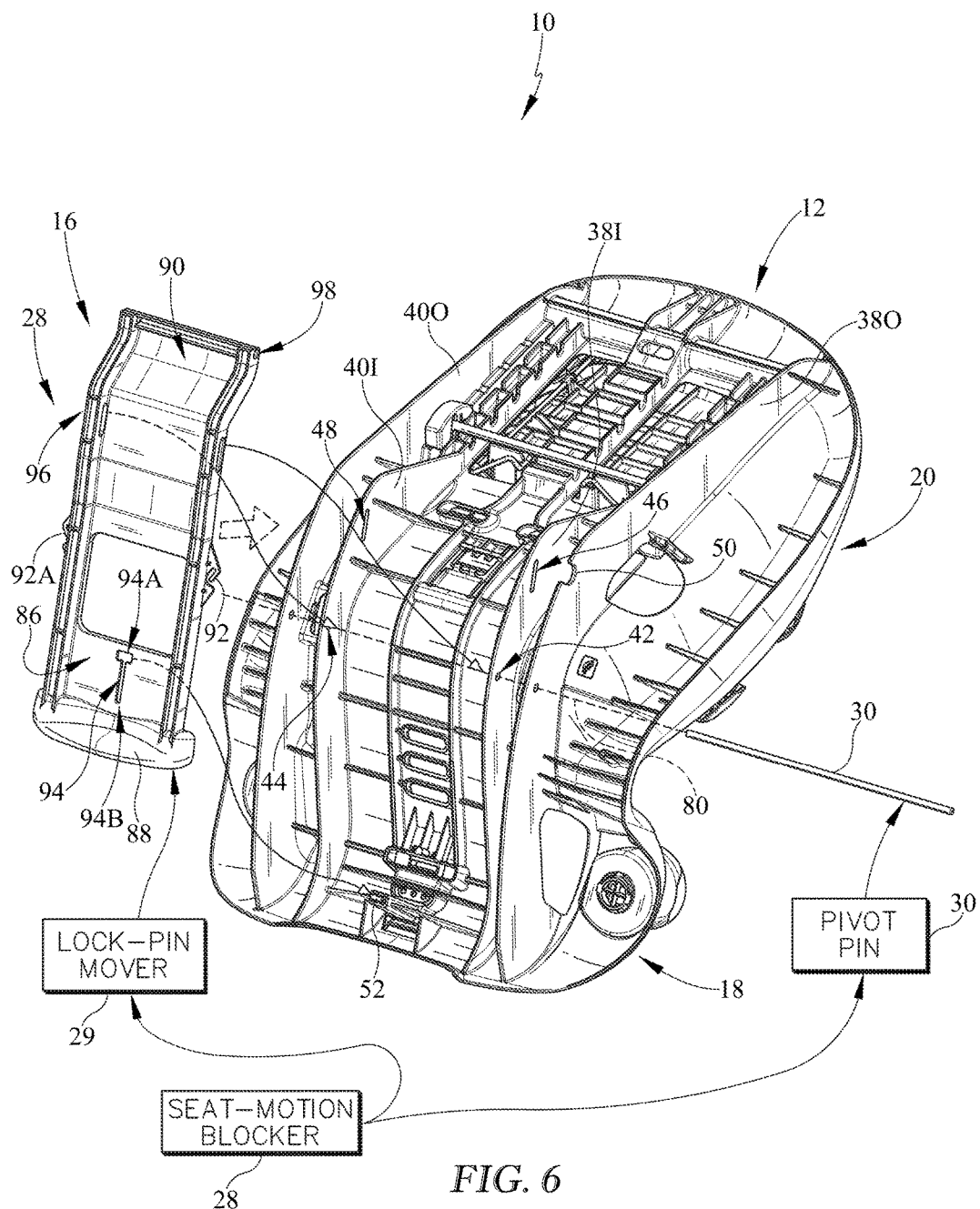
Figure 7:
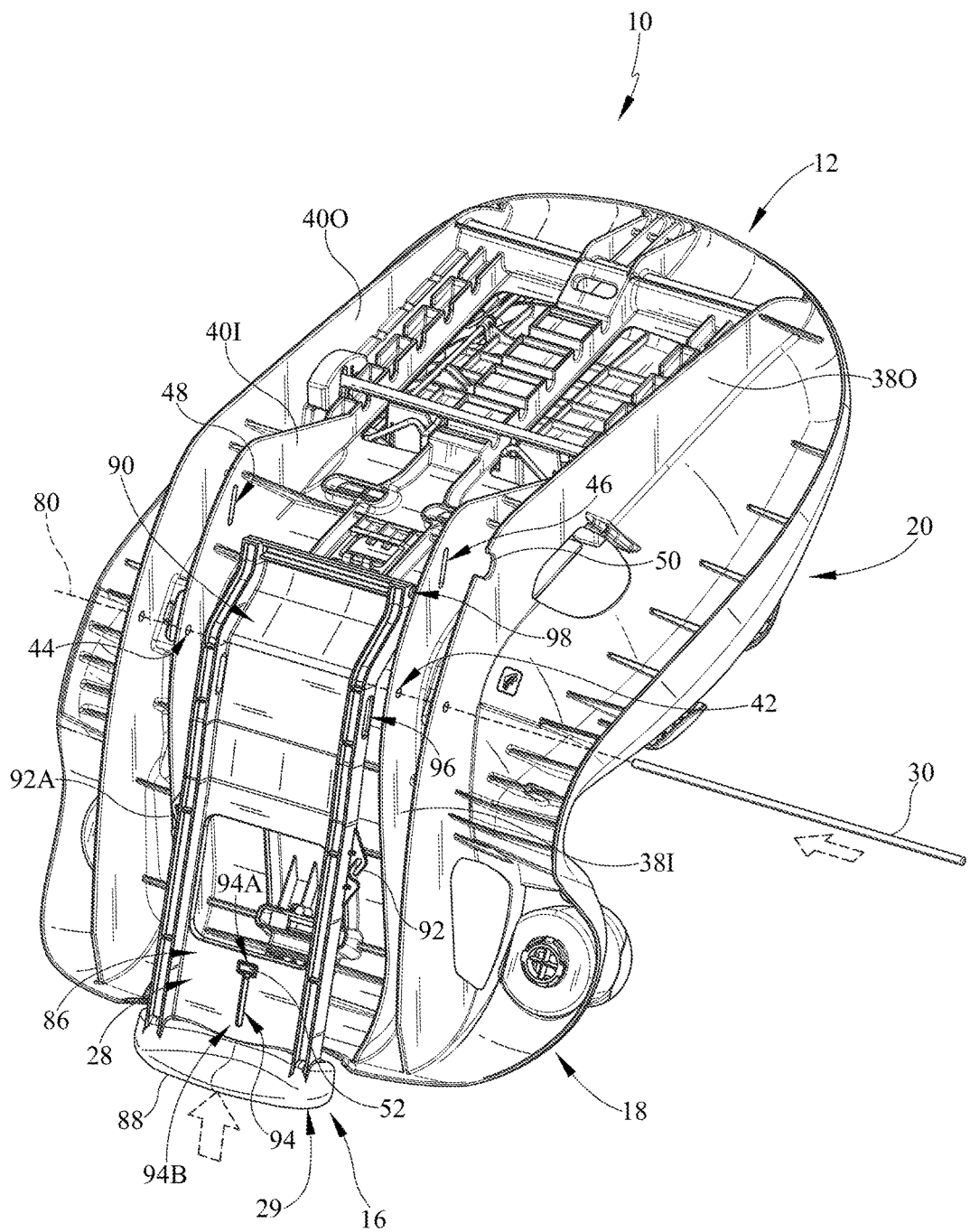
Figure 8:
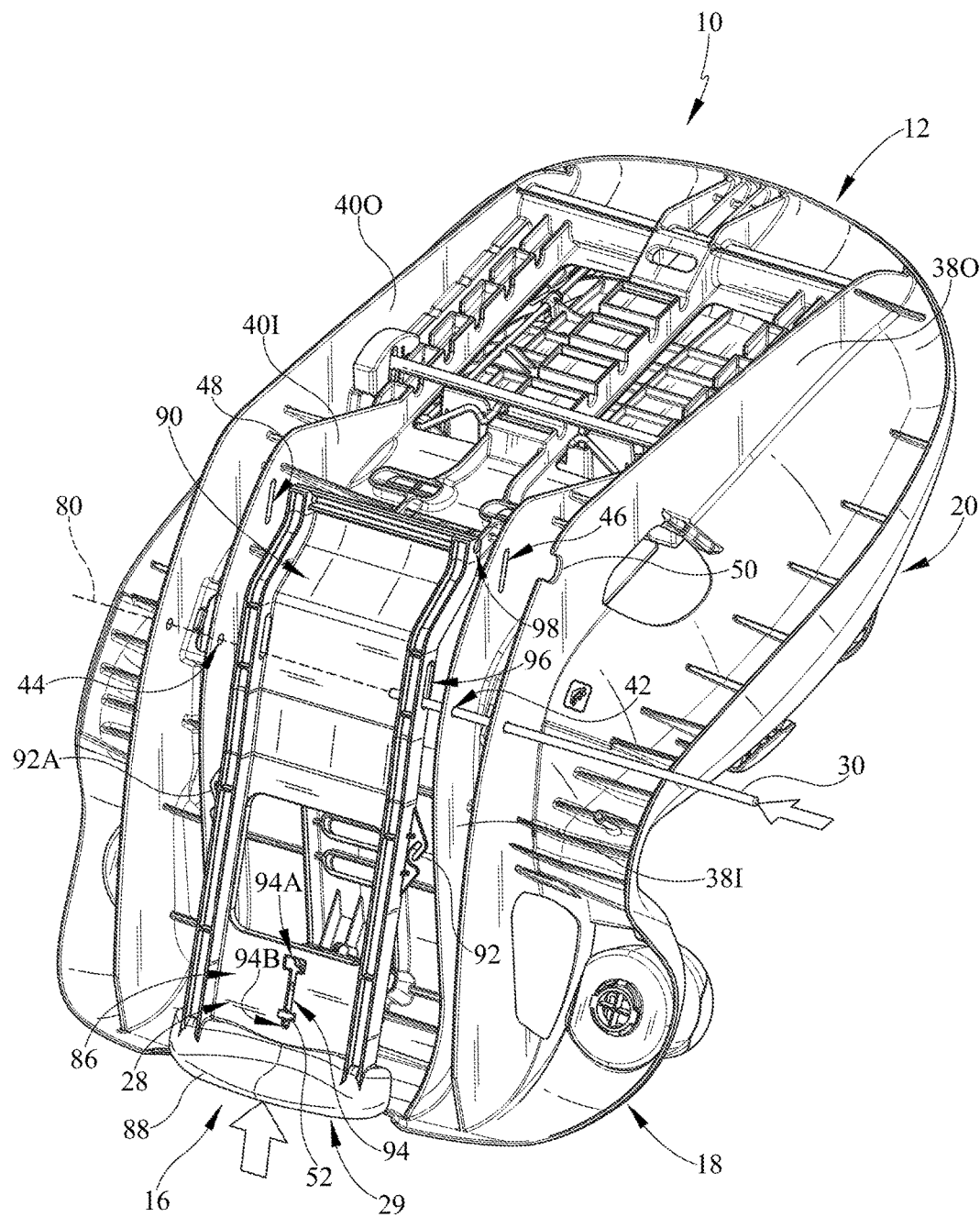
Figure 9:
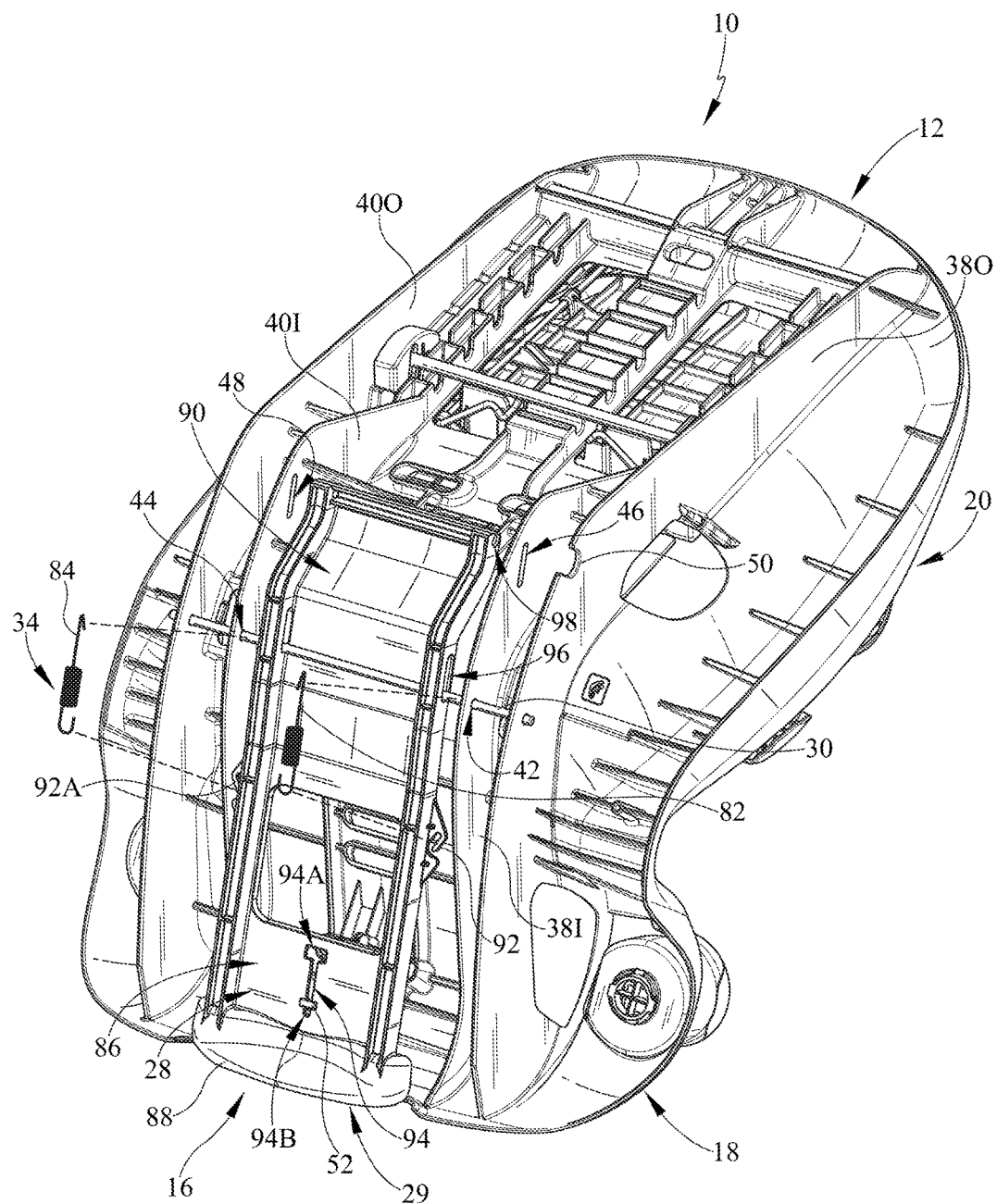
Figure 10:
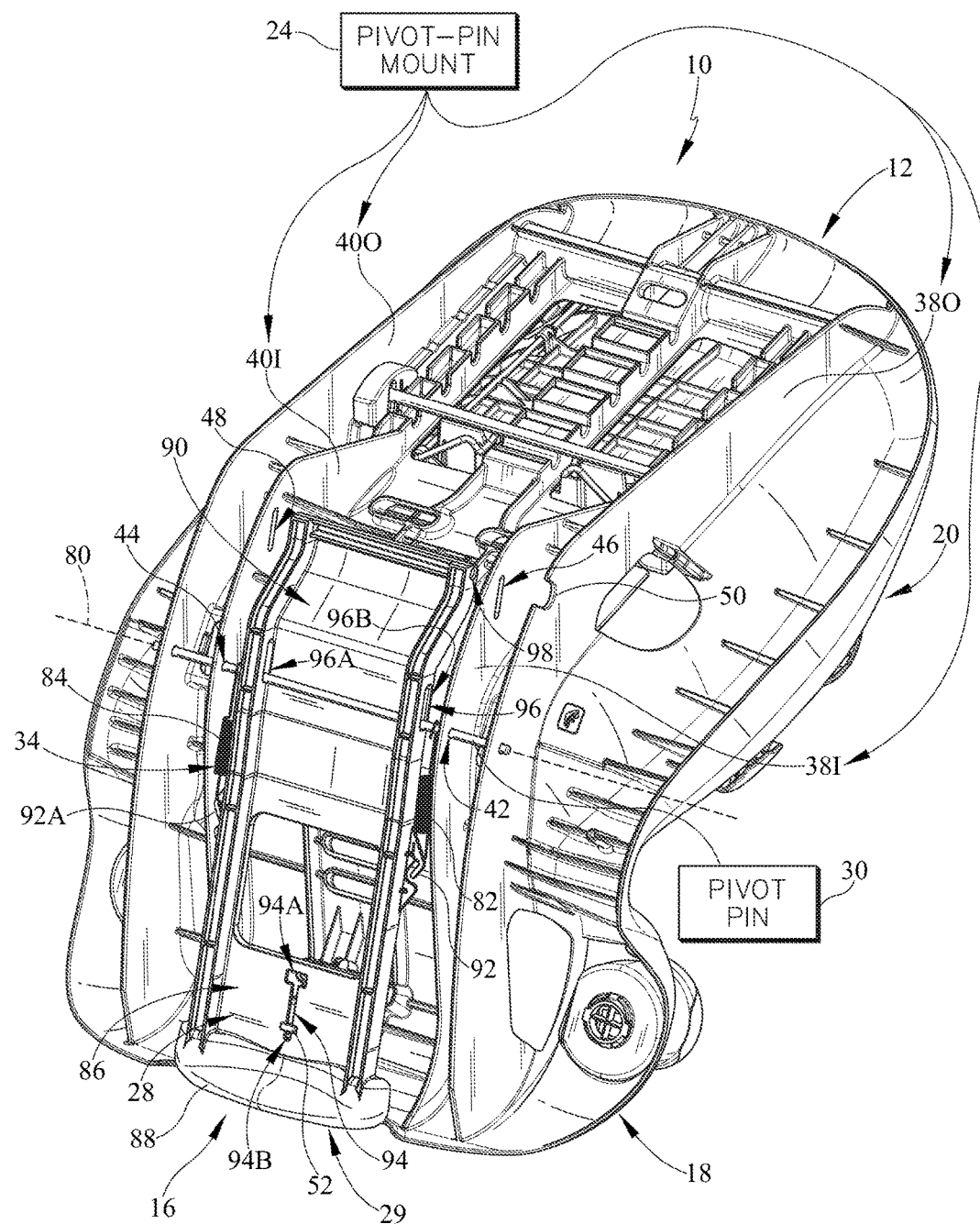
Figure 11:
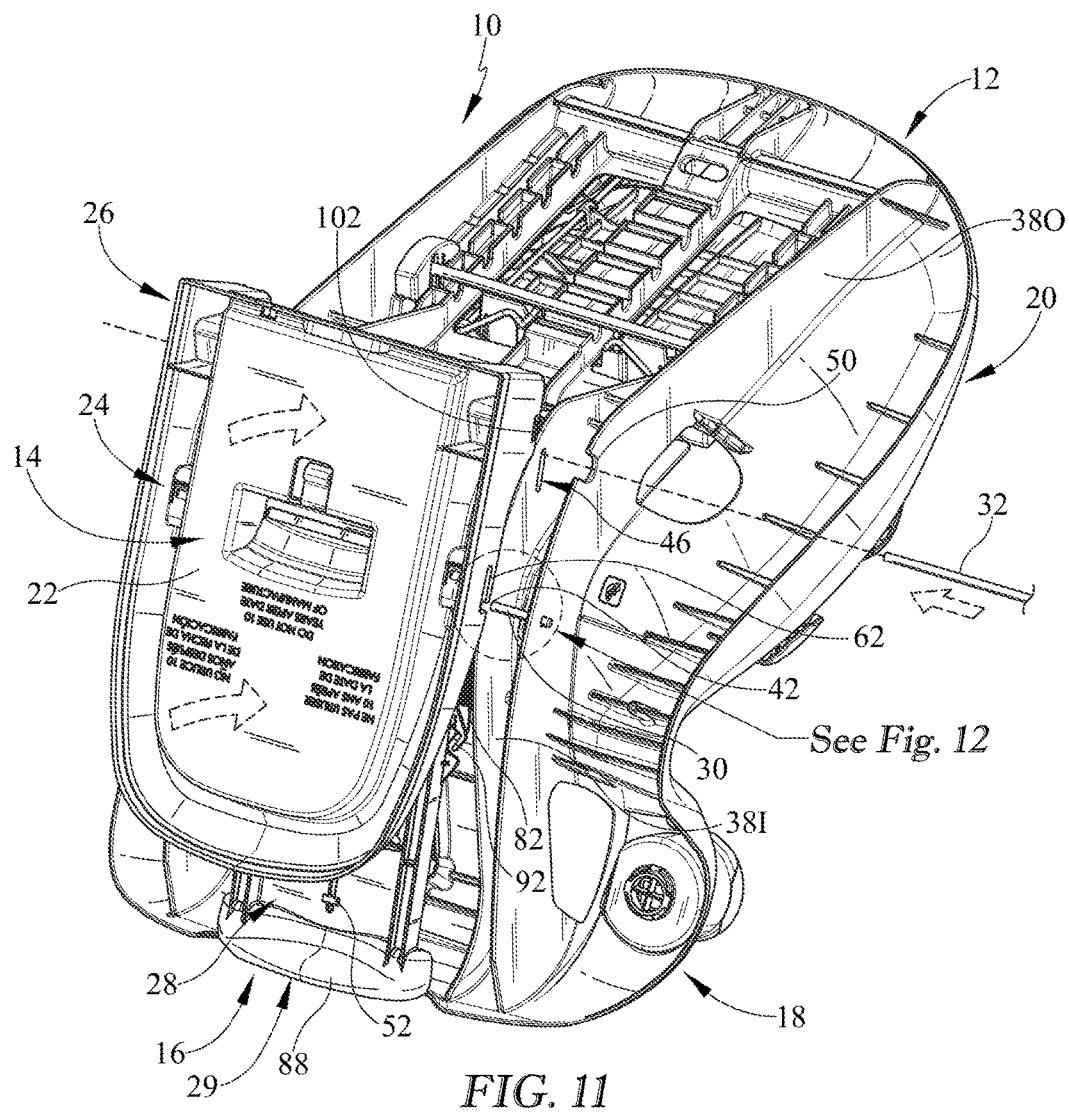
Figure 12:
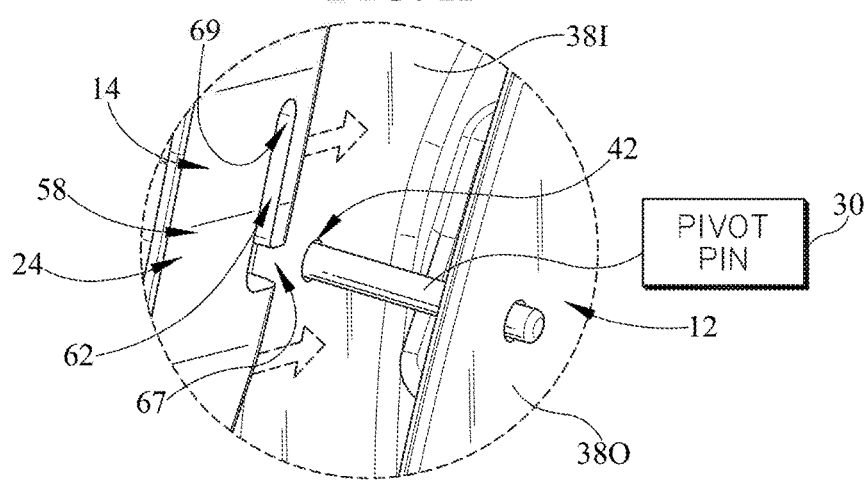
Figure 13:
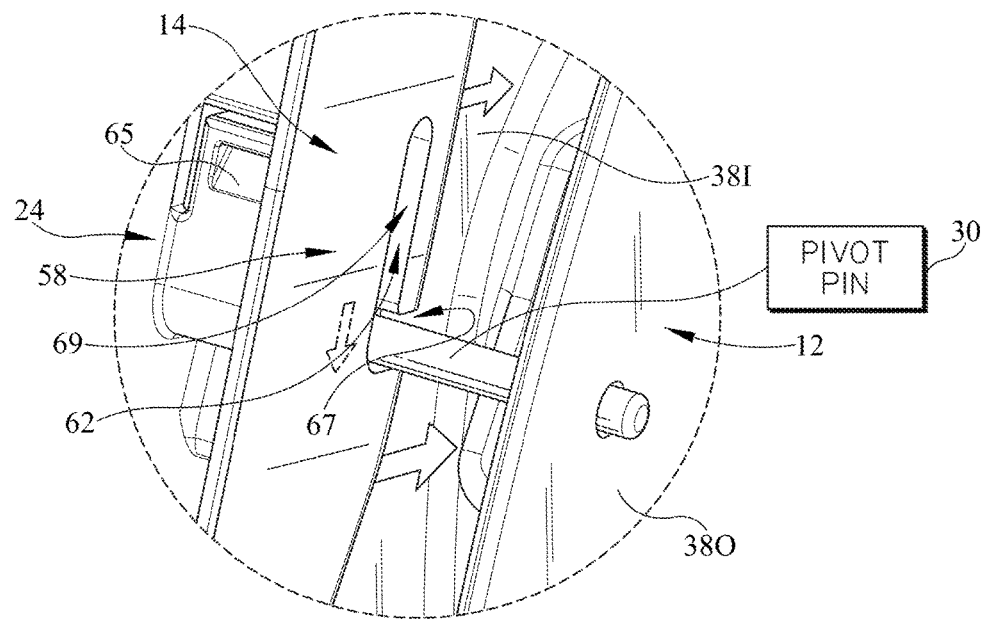
Figure 14:
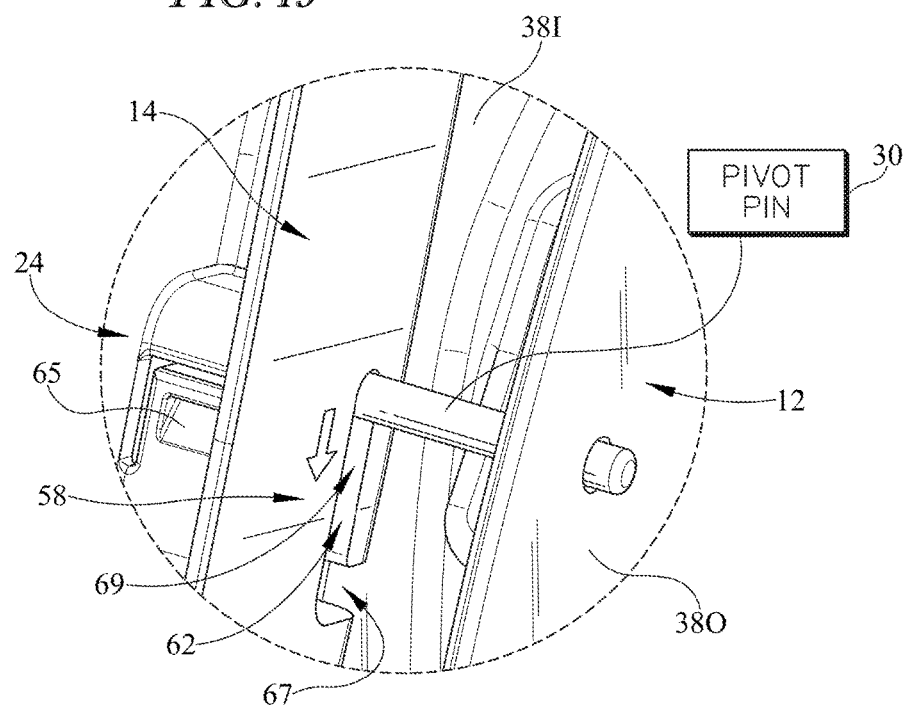
Figure 15:
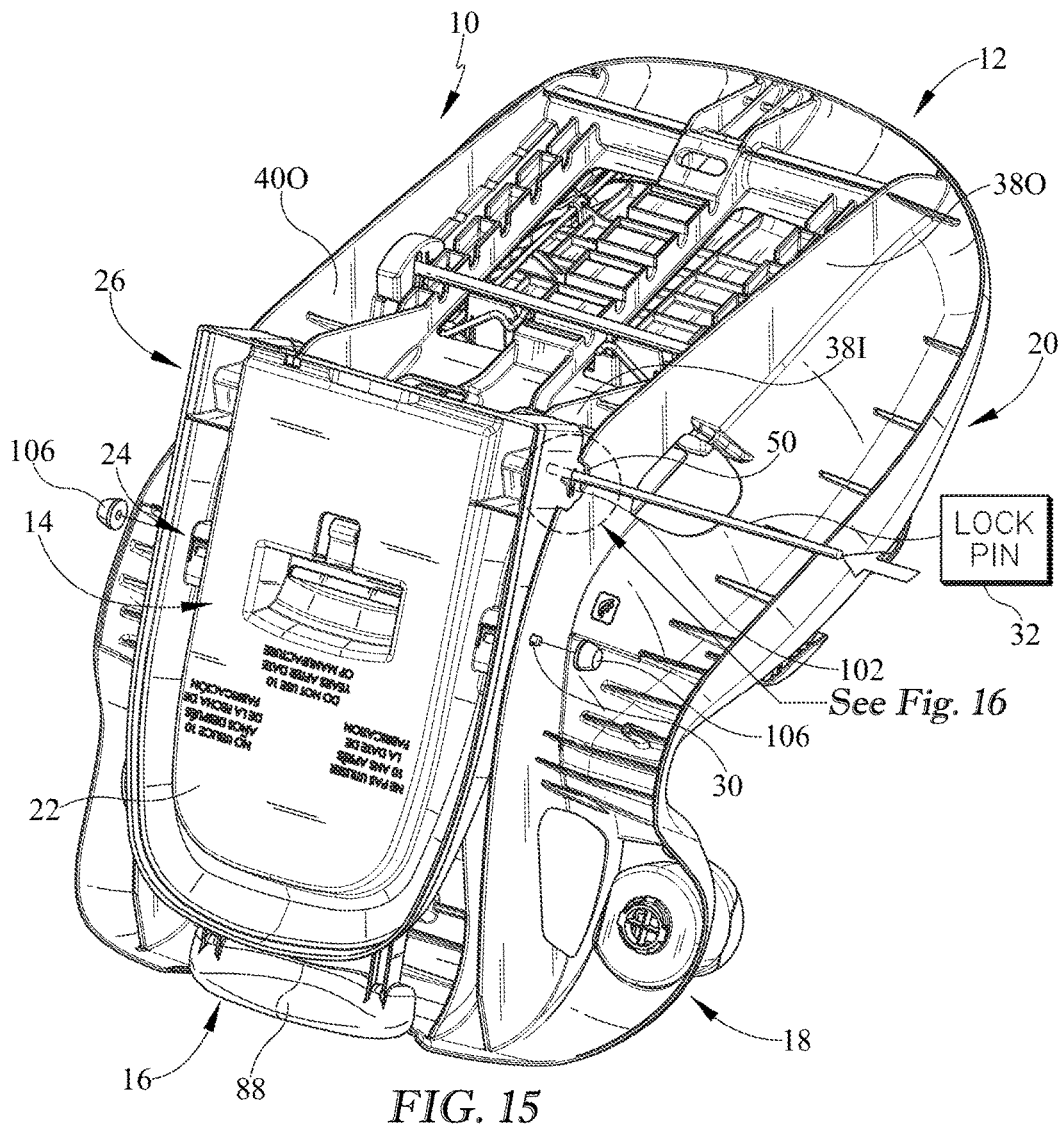
Figure 16:
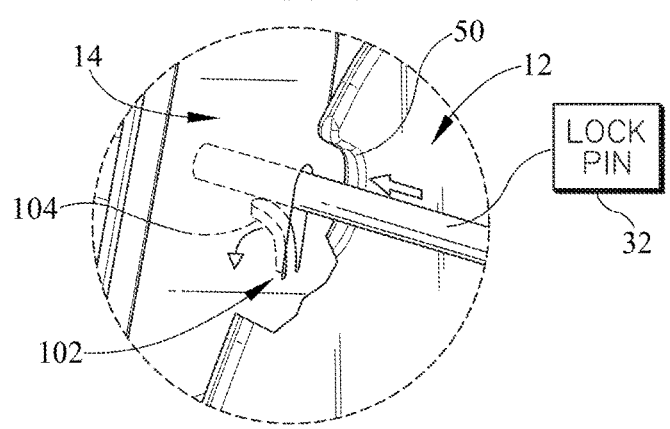
Figure 17:
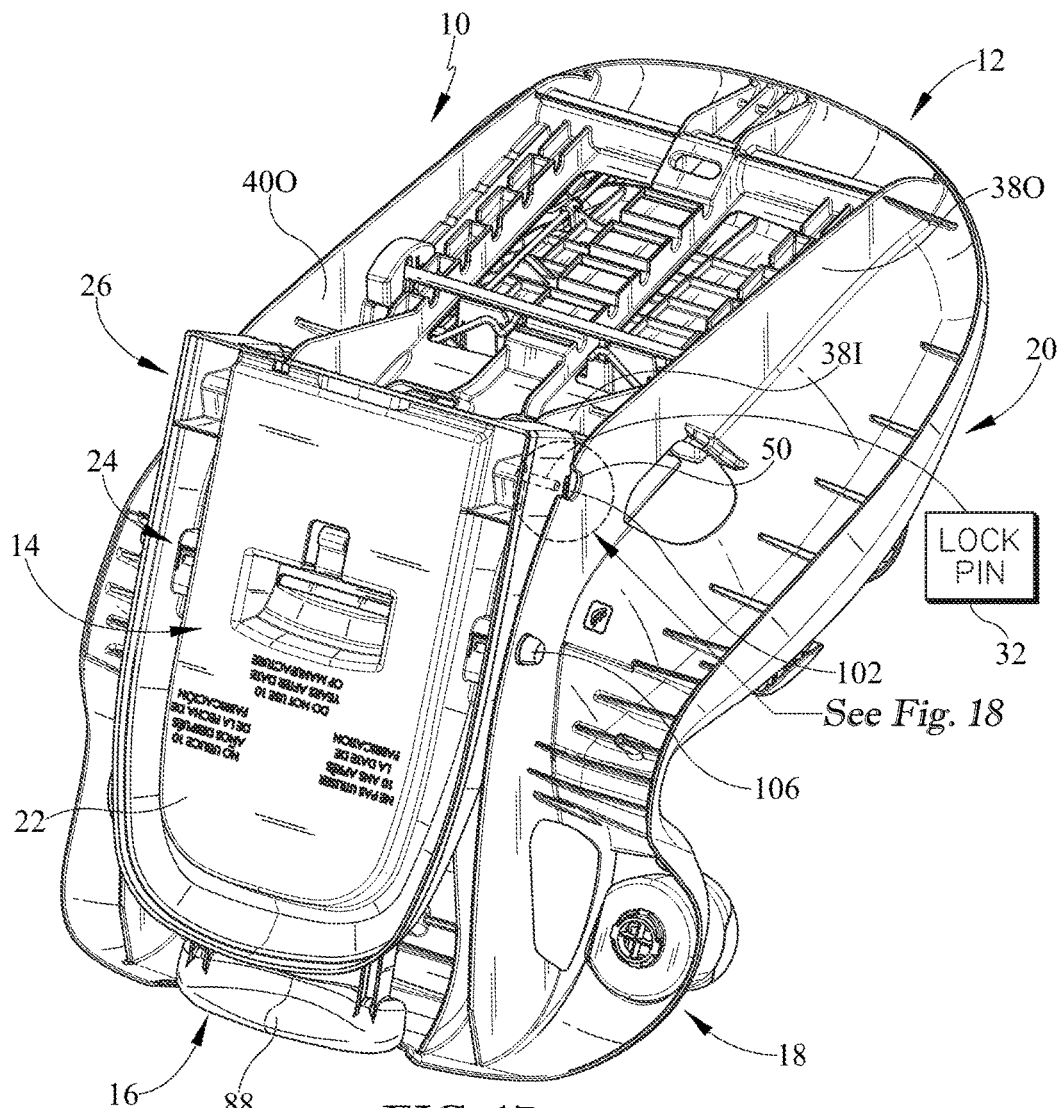
Figure 18:
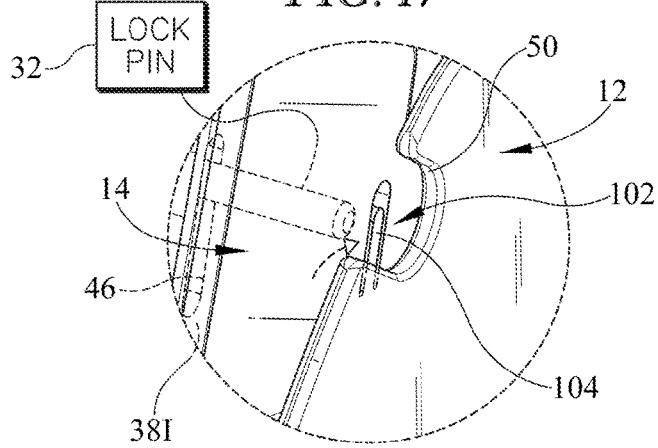
Figure 19A:
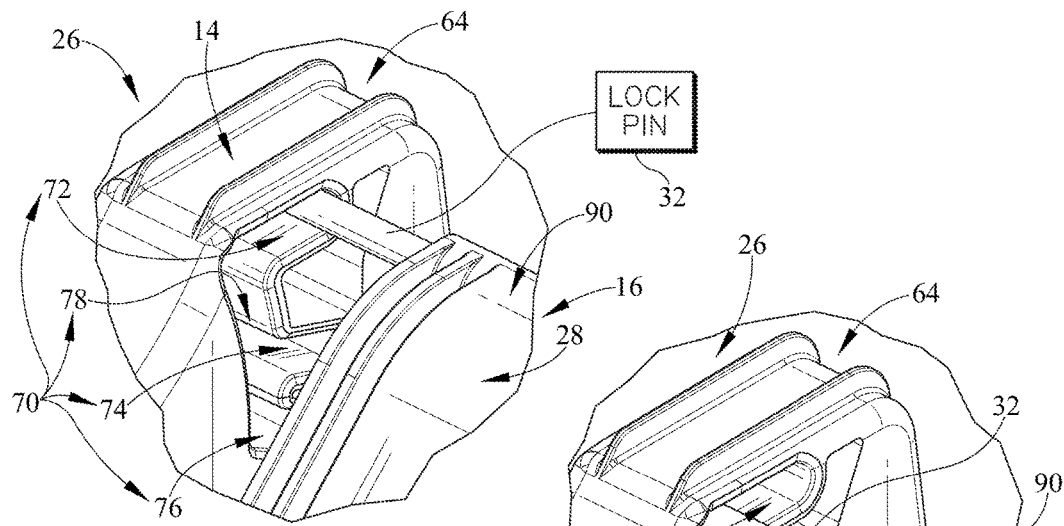
Figure 20A:
Figure 21A:
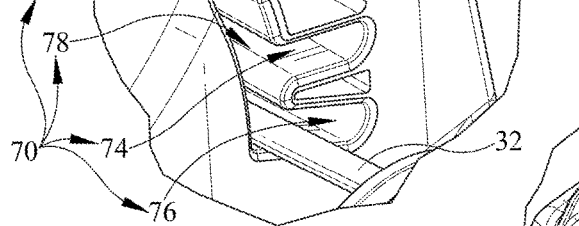
Figure 22A:
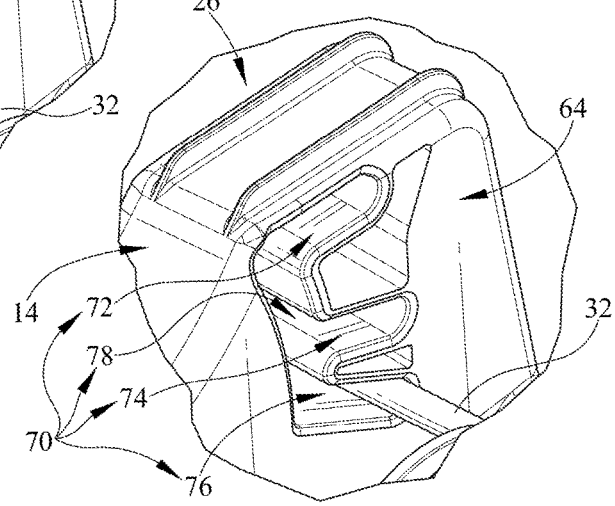

FIG. 5 is an exploded perspective view of the child restraint of FIG. 1 showing that the child restraint includes, from top to bottom, a juvenile vehicle seat including a seat bottom and a seat back extending upwardly away from the seat bottom, a seat-pivot-and-lock unit comprising a pivot pin and a seat-motion blocker including a lock-pin mover having a grip handle and a lock pin for mating with a far end of the lock-pin mover to lie in spaced-apart relation to the grip handle, the lock-pin mover being arranged to be moved by a caregiver between an extended seat-anchoring position relative to the seat support to a retracted seat-tilting position to free the tiltable juvenile vehicle seat for pivotable movement about a seat-pivot axis extending through the pivot pin relative to the seat support, the pivot pin being configured to pivotably couple the tiltable juvenile vehicle seat to the seat-pivot-and-lock unit and the seat support, the lock pin, and the springs, and the seat support including a support foundation arranged to set on a passenger seat of a vehicle, a pivot mount arranged to receive the pivot pin, and a lock mount arranged to receive the lock pin;

FIG. 5A is an enlarged perspective view of the seat-pivot-and-lock unit of FIG. 5 with portions broken away to show that the lock-pin mover of the seat-motion blocker is formed to define a lost-motion pivot pin slot arranged to receive the pivot pin to couple the seat-pivot-and-lock unit and the seat support to the juvenile vehicle seat and that the lost-motion pivot pin slot extends laterally through the lock-pin mover of the seat-motion blocker;

FIGS. 6 through 18 are a series of views showing an assembly process in accordance with the present disclosure for assembling the child restraint of FIG. 4, the assembly process allows an assembler to inspect visually the seat-pivot-and-lock unit and determine whether the springs included in the seat-pivot-and-lock unit are installed properly before coupling the seat support for pivotable movement to the tiltable juvenile vehicle seat, which may block the assembler's ability to inspect visually the springs included in the seat-pivot-and-lock unit and provided to yieldably urge the lock-pin mover normally to the extended seat-anchoring position;

FIG. 6 is a perspective view of the underside of the tiltable juvenile vehicle seat, the lock-pin mover, and the pivot pin and suggesting that the lost-motion pivot pin slot formed in the lock-pin mover will be aligned with the pivot-pin receiving apertures formed in the first and second ribs of the tiltable juvenile vehicle seat and that a first step of assembling the child restraint includes aligning a T-shaped guide slot formed in the lock-pin mover with an anchor tab extending from the underside of the tiltable juvenile vehicle seat and aligning the pivot pin with the seat-pivot axis that extends through the pivot-pin receiving apertures formed in the ribs;

FIG. 7 is a view similar to FIG. 6 showing the seat-motion blocker positioned relative to the tiltable juvenile vehicle seat such that an upper end of the T-shaped guide slot formed in the lock-pin mover receives the anchor tab extending from the underside of the tiltable juvenile vehicle seat and that the pivot pin is aligned with the seat-pivot axis that extends through the pivot-pin receiving apertures and suggesting that the lock-pin mover is moved upwardly relative to the tiltable juvenile vehicle seat to cause the lost-motion pivot pin slot formed in the lock-pin mover to be aligned with the pivot-pin receiving apertures formed in the first and second ribs of the tiltable juvenile vehicle seat;

FIG. 8 is a view similar to FIG. 7 showing that the lock-pin mover has been moved upwardly relative to the tiltable juvenile vehicle seat so that the anchor tab is positioned in a lower end of the T-shaped guide slot to restrict movement of the lock-pin mover relative to the tiltable juvenile vehicle seat and showing that the pivot pin has been inserted through a first pivot-pin receiving aperture and inserted partway through the lost-motion pivot pin slot and suggesting that the pivot pin is inserted fully through the pivot-pin receiving apertures and the lost-motion pivot pin slot to couple the lock-pin mover for sliding movement to the underside of the tiltable juvenile vehicle seat;

FIG. 9 is a view similar to FIG. 8 showing that the seat-motion blocker has been coupled to the first and second ribs included in the tiltable juvenile vehicle seat by the pivot pin that extends through the ribs and the seat-motion blocker and that the two springs included in the seat-pivot-and-lock unit are spaced apart from the tiltable juvenile vehicle seat and suggesting that each spring is coupled to the pivot pin and to a retainer finger included in the lock-pin mover so that the springs can be visually inspected for proper installation before the seat support is coupled to the tiltable juvenile vehicle seat (as shown, for example, in FIG. 11) which may block the ability to inspect the springs visually;

FIG. 10 is a view similar to FIG. 9 showing a first end of each spring is coupled to the pivot pin and a second end of each spring is coupled to a retainer finger included in the lock-pin mover so that the springs can be visually inspected for proper installation before the seat support is coupled to the tiltable juvenile vehicle seat which may block the ability to inspect the springs visually and further showing that the springs bias the lock-pin mover so that a retracted end of the lost-motion pivot pin slot engages the pivot pin;

FIG. 11 is a view similar to FIG. 10 showing the seat support spaced apart from the tiltable juvenile vehicle seat and seat-pivot-and-lock unit so that openings of L-shaped pivot pin slots are aligned with the pivot pin and that the lock pin included in the seat-pivot-and-lock unit is aligned with lock-pin receiving slots formed in the first and second ribs before the lock pin is mated with the lock-pin mover;

FIG. 12 is an enlarged view of a circled region of FIG. 11 showing the seat support spaced apart from the tiltable juvenile vehicle seat and seat-pivot-and-lock unit so that an opening of one of the L-shaped pivot pin slots is aligned with the pivot pin and suggesting that the seat support is moved relative to the pivot pin so that the pivot pin is received in the L-shaped pivot pin slots;

FIG. 13 is a view similar to FIG. 12 after the seat support has been moved toward the pivot pin to cause the pivot pin to be received in the L-shaped pivot pin slots and suggesting that the seat support is moved downwardly relative to the pivot pin to cause a blocking end of the L-shaped slots to engage the pivot pin;

FIG. 14 is a view similar to FIG. 13 after the seat support has been moved downwardly relative to the pivot pin so that the blocking ends of the L-shaped slots engage the pivot pin to cause the seat support to be pivotably coupled to the pivot pin and a pivot-pin blocker included in the seat support blocks translation of the seat support relative to the pivot pin so that the pivot pin is blocked from exiting the L-shaped slot;

FIG. 15 is a perspective view of the child restraint of FIG. 11 after the seat support has been coupled to the pivot pin and showing that the lock pin of seat-pivot-and-lock unit inserted through the lock-receiving slot formed in the first rib of the tiltable juvenile vehicle seat and suggesting that the lock pin is inserted through the lock-pin receiving slots formed in the tiltable juvenile vehicle seat, the lock-pin access formed in the seat support, and a lock-pin channel formed in the seat-pivot-and-lock unit;

FIG. 16 is an enlarged view of a circled region of FIG. 15 showing that the lock-pin access included in the seat support includes an elastic deformable flange that extends into an opening formed in the seat support and further showing that the deformable flange pivots when the lock pin is inserted into the lock-pin access to allow the lock pin to pass through the lock-pin access;

FIG. 17 is a perspective view similar to FIG. 15 showing that the lock pin has been inserted through the lock-pin access formed in the seat support, the lock-pin receiving slots formed in the tiltable juvenile vehicle seat, and the lock-pin channel formed in the seat-pivot-and-lock unit;

FIG. 18 is a view similar to FIG. 16 showing that the elastic deformable flange included in the lock-pin access pivots back to its initial state after the lock pin is inserted into the lock-pin access to block the lock pin from exiting the lock pin axis;

FIGS. 19-22A are a series of views showing the juvenile vehicle seat being moved between an upright orientation and a second tilt orientation;

FIG. 19 is a perspective view of the child restraint of FIG. 4 in an upright orientation and suggesting that the seat-pivot-and-lock unit may be pulled outwardly away from the tiltable juvenile vehicle seat by a caregiver against a biasing force generated by the springs to allow the juvenile vehicle seat to assume one of two tilt orientations;

FIG. 19A is an enlarged view of FIG. 19 showing the lock pin included in the seat-pivot-and-lock unit received in a first channel formed in the seat support to retain the tiltable juvenile vehicle seat in the upright orientation relative to the seat support;

FIG. 20 is a view similar to FIG. 19 showing that the seat-pivot-and-lock unit has been pulled outwardly relative to the seat support to cause the seat-pivot-and-lock unit to be in a retracted position and further showing portions of the child restraint broken away to reveal that the lock pin is moved out of the first pin-receiver channel formed in the seat support and into a lock-pin transfer channel formed in the seat support to free the tiltable juvenile vehicle seat for pivotable movement relative to the seat support about the seat-pivot axis established by the pivot pin when the seat-pivot-and-lock unit is in the retracted seat-tilting position and suggesting that the tiltable juvenile vehicle seat may be pivoted clockwise about the seat-pivot axis relative to the seat support to assume one of two tilt orientations when the seat-pivot-and-lock unit is in the retracted seat-tilting position;

FIG. 20A is an enlarged view of FIG. 20 showing the lock pin included in the seat-pivot-and-lock unit received in an upper end of the lock-pin transfer channel formed in the seat support to free the tiltable juvenile vehicle seat for pivotable movement about the seat-pivot axis relative to the seat support;

FIG. 21 is a view similar to FIG. 20 showing the seat-pivot-and-lock unit in the retracted seat-tilting position in which the lock pin included in the seat-pivot-and-lock unit is received in the lock-pin transfer channel and the tiltable juvenile vehicle seat has been pivoted clockwise about the seat-pivot axis relative to the seat support to assume a second tilt orientation;

FIG. 21A is an enlarged view of FIG. 21 showing the lock pin included in the seat-pivot-and-lock unit received in a lower end of the lock-pin transfer channel formed in the seat support as a result of the tiltable juvenile vehicle seat being pivoted about the seat-pivot axis relative to the seat support to assume the second tilt orientation;

FIG. 22 is a view similar to FIG. 21 showing the seat-pivot-and-lock unit in an extended seat-tilting position in which the lock pin included in the seat-pivot-and-lock unit is received in one of the first pin-receiver channel, a second pin-receiver channel, and a third pin-receiver channel formed in the seat support as a result of a user releasing the seat-pivot-and-lock unit and the springs included in the seat-pivot-and-lock unit biasing the seat-pivot-and-lock unit inwardly relative to the seat support and further showing that the lock pin is received in the third pin-receiver channel to block relative movement between the tiltable juvenile vehicle seat and the seat support to retain the juvenile vehicle seat in the second tilt orientation; and FIG. 22A is an enlarged view of FIG. 22 showing the lock pin included in the seat-pivot-and-lock unit received in the third pin-receiver channel formed in the seat support as a result of the seat-pivot-and-lock unit being released by a user to block relative movement between the tiltable juvenile vehicle seat and the seat support to retain the juvenile vehicle seat in the second tilt orientation.

DETAILED DESCRIPTION

A child restraint 10 includes a tiltable juvenile vehicle seat 12, a seat support 14, and a seat-pivot-and-lock unit 16 configured to support juvenile vehicle seat 12 for pivotable movement on seat support 14 about a seat-pivot axis and to lock the tiltable juvenile vehicle seat 12 in a stationary position relative to seat support 14 in an upright orientation or one of several tilted orientations under the control of a caregiver. In illustrative embodiments, seat-pivot-and-lock unit 16 includes springs 82, 84 that are installed before tiltable juvenile vehicle seat 12 is pivotably mounted on the underlying seat support 14 so that spring installation can be visually inspected by an assembly technician in accordance with the present disclosure, and as shown, for example, in FIGS. 9 and 10.

As suggested in FIG. 5, seat-pivot-and-lock unit 16 comprises a seat-motion blocker 28, a pivot pin 30, and springs 82, 84. Seat-motion blocker 28 includes a lock-pin mover 29 and a lock pin 32 coupled to lock-pin mover 29 to move back and forth therewith relative to tiltable juvenile vehicle seat 12. In use, pivot pin 30 lies in a stationary position on seat support 14 and extends through a lost-motion pivot pin slot 96 formed in lock-pin mover 29 so that the lock-pin mover 29 can be moved back and forth relative to pivot pin 30 as lock-pin mover 29 is moved by a caregiver between (1) an extended seat-anchoring position in which the lock pin 32 carried on lock-pin mover 29 is urged to extend into one of the pin-receiver channels 72, 74, 76 formed in seat support 14 and (2) a retracted seat-tilting position in which lock pin 32 can be withdrawn from pin-receiver channels 72, 74, 76 and then moved in a lock-pin transfer channel 78 that is arranged to communicate with each of the pin-receiver channels 7, 74, 76 to the entrance into another of the pin-receiver channels 72, 74-76 at which time the springs 82, 84 will operate to apply a biasing force to lock-pin mover 29 to cause lock-pin mover 29 to move relative to juvenile vehicle seat 12 to cause lock pin 32 to move into the selected pin-receiver channel 72, 74, 04 76 formed in seat support 14 so that a new tilt orientation of the juvenile vehicle seat 12 relative to the underlying seat support 14 is established.

A method of assembly child restraint 10 in accordance with the present disclosure comprises the steps of mating pivot pin 30 to juvenile vehicle seat 12 and lock-pin mover 29 and coupling springs 82, 84 to lock-pin mover 29 and pivot pin 30 before juvenile vehicle seat 12 is pivotably mounted on seat support 14 using pivot pin 30 to pivot about a seat-pivot axis 80 established by pivot pin 30. Delaying pivotable coupling of juvenile vehicle seat 12 to seat support 14 until after springs 82, 84 are installed allows for visual inspection of the springs 82, 84 by an assembly technician to ensure they are installed properly.

A method of assembling a child restraint 10 in accordance with the present disclosure comprises the steps of mating a lock-pin mover 29 of a slidable tilt controller 28 on the underside of a tiltable juvenile vehicle seat 12 for sliding movement between an extended seat-anchoring position and a retracted seat-tilting position and coupling a mover-biasing spring 82 and/or 84 to the tiltable juvenile vehicle seat 12 and to the lock-pin mover 29 to yieldably urge the lock-pin mover 29 to the extended seat-anchoring position before the lock-pin mover 22 is pivotably coupled to a seat support 14 that is adapted to set on a passenger vehicle seat to position the tiltable juvenile vehicle seat 12 on the passenger vehicle seat so that visual inspection of proper coupling of the mover-biasing spring 82/84 to the tiltable juvenile vehicle seat 12 and to the lock-pin mover 29 by an assembly technician is possible. The method further comprises the step of mounting the lock-pin mover 29 on a seat support 14 adapted to set on a passenger vehicle seat after the coupling step to support the lock-pin mover 29 and the tiltable juvenile vehicle seat 12 for pivotable movement as a unit relative to the seat support 14 about a seat-pivot axis 80 and locate the mover-biasing spring 82/84 in a hidden position between the tiltable juvenile vehicle seat 12 and the seat support 14 that is not visible to the assembly technician so as to facilitate tilting movement of the juvenile vehicle seat 12 relative to the seat support 14 between at least two different tilted positions when the lock-pin mover 29 is moved by a caregiver against a biasing force provided by the mover-biasing spring 82/84 to the retracted seat-tilting position.

The method further comprises the step of passing a lock pin 32 through an aperture formed in the juvenile vehicle seat 12 after the mating step to mount the lock pin 32 on the lock-pin mover 29 for movement therewith relative to the juvenile vehicle seat 12 when the lock-pin mover 29 is moved by a caregiver to assume the retracted seat-tilting position so that the lock pin 32 can be aligned with and extended into a selected one of a first lock-pin-receiving channel section 72 formed in the seat support 14 and associated with a first tilt angle of the juvenile vehicle 12 seat relative to the seat support 14 and a different second lock-pin-receiving channel section 74 formed in the seat support 14 and associated with a different second tilt angle of the juvenile vehicle seat 12 relative to the seat support 14.

Seat support 14 includes pin-removal blocker means 104 for blocking removal of the lock pin 32 from the lock-pin mover 29 through the aperture after the passing step. Seat support 14 includes a panel formed to include the aperture. The pin-removal blocker means 104 includes a deformable flange 104 made of an elastic material and coupled to the panel for movement in a direction toward the lock-pin mover 29 during the passing step as shown in phantom in FIG. 16 to allow movement of the lock pin 32 in a first direction 321 to engage the lock-pin mover and block movement of the lock pin 32 in an opposite second direction through the aperture after the passing step.

Lock-pin mover 29 has a grip handle 88 at a first end thereof, a lock body 90 at an opposite second end thereof, and a middle portion formed to include a lost-motion pivot pin slot 96 as suggested in FIGS. 5 and 5A. The coupling step includes the steps of placing the lock body 90 in a space formed between rearwardly extending first and second inner ribs 30I, 40I included in the juvenile vehicle seat 12 to align the lost-motion pivot pin slot 96 with a first aperture 42 formed in the first inner rib 38I and a second aperture 44 formed in the second inner rib 40I and passing the pivot pin 30, in sequence through the first aperture 42, the lost-motion pivot pin slot 96, and the second aperture 44 to establish the seat-pivot axis 90. Lock-pin mover 29 and pivot pin 28 cooperate to form a slidable seat-motion blocker 28.

A child restraint 10 in accordance with the present disclosure is shown in FIGS. 1-4. Child restraint 10 includes a tiltable juvenile vehicle seat 12, a seat support 14, and a seat-pivot-and-lock unit 16 arranged to control relative movement between tiltable juvenile vehicle seat 12 and seat support 14. Child restraint 10 can be assembled so that an assembler can visually inspect seat-pivot-and-lock unit 16 during assembly and determine whether bias members 34 included in seat-pivot-and-lock unit 16 are properly installed before coupling seat support 14 to tiltable juvenile vehicle seat 12 which may block the assembler's ability to inspect visually bias members 34 as suggested in FIGS. 1-4.

In an illustrative process of assembling child restraint 10, an assembler is able to inspect visually seat-pivot-and-lock unit 16 and determine whether springs 82, 84 included in seat-pivot-and-lock unit 16 are properly installed before coupling seat support 14 to tiltable juvenile vehicle seat 12 which may block the assembler's ability to inspect visually that springs 82, 84 are properly coupled to a pivot pin 30 and retainer fingers 92, 92A as suggested in FIGS. 1-4.

Tiltable juvenile vehicle seat 12 is oriented to reveal an underside of a seat bottom 18 included in tiltable juvenile vehicle seat 12 so that ribs 38I, 40I are accessible as shown in FIG. 1. A lock-pin mover 29 of seat-motion blocker 28 is positioned relative to tiltable juvenile vehicle seat 12 so that a T-shaped guide slot 94 formed in lock-pin mover 29 of seat-motion blocker 28 is aligned with an anchor tab 52 extending from the underside of tiltable juvenile vehicle seat 12.

Pivot pin 30 is inserted through tiltable juvenile vehicle seat 12 and lock-pin mover 29 to couple seat-motion blocker 28 to tiltable juvenile vehicle seat 12 as shown in FIG. 2. Springs 82 and 84 are provided and coupled to pivot pin 30 and lock-pin mover 29 of seat-motion blocker 28. Springs 82, 84 can be visually inspected for proper installation because seat support 14 has not been coupled to tiltable juvenile vehicle seat 12.

Seat support 14 is moved toward pivot pin 30 and pivotably coupled to pivot pin 30 as suggested in FIG. 3. A lock pin 32 is inserted through seat support 14 and seat-pivot-and-lock unit 16 to retain selectively tiltable juvenile vehicle seat 12 in position relative to seat support 14. A fully assembled child restraint 10 is shown in FIG. 4.

Child restraint 10 includes tiltable juvenile vehicle seat 12, seat support 14, and seat-pivot-and-lock unit 16 as shown in FIG. 5. Tiltable juvenile vehicle seat 12 includes seat bottom 18 and a seat back 20 extending upwardly away from seat bottom 18. Seat support 14 includes a support foundation 22 arranged to set on a passenger seat of a vehicle, a pivot mount 24 arranged to receive pivot pin 30, and a lock mount 26 arranged to receive lock pin 32 as shown in FIG. 5. Seat-pivot-and-lock unit 16 includes seat-motion blocker 28, pivot pin 30, lock pin 32, and at least one bias member 34 such as springs 82, 84.

Seat bottom 18 includes a seat pan 36, first and second ribs 38I, 40I, and anchor tab 52 as shown in FIG. 6. In the illustrative embodiment, seat bottom 18 further includes outer ribs 38O, 40O as shown in FIG. 6. First and second ribs 38I, 40I extend away from seat pan 36. Each rib 38I, 40I is formed to include a pivot-pin receiving aperture 42, 44 and a lock-pin receiving slot 46, 48. In the illustrative embodiment, outer rib 38O is formed to include a lock-pin cutout 50 arranged to allow lock pin 32 to pass through outer rib 38O when lock pin 32 is being installed. Anchor tab 52 extends away from seat pan 36. Anchor tab 52 is arranged to be received in a T-shaped guide slot 94 formed in seat-motion blocker 28 to guide seat-motion blocker 28 when lock-pin mover 29 of seat-motion blocker 28 moves between the retracted seat-tilting and extended seat-anchoring positions.

Anchor tab 52 is formed to include a wide upper portion and a narrow lower portion that is narrower than the wide upper portion. The wide upper portion is arranged to be received in an upper portion 94A of T-shaped guide slot 94. The narrow lower portion is arranged to allow lock-pin mover 29 of seat-motion blocker 28 to slide relative to tiltable juvenile vehicle seat 12 while anchor tab 52 restricts relative movement between seat-motion blocker 28 and the tiltable juvenile vehicle seat 12. The upper wide portion of the anchor tab 52 is blocked by a narrow lower portion 94B of T-shaped guide slot 94 so that seat-motion blocker 28 is slidably coupled to anchor tab 52.

Seat support 14 includes support foundation 22, pivot mount 24, and lock mount 26 as shown in FIG. 5. Support foundation 22 is arranged to set on a passenger seat of a vehicle. Pivot mount 24 includes first pivot-pin retainer 56, a second pivot-pin retainer 58 spaced apart from the first pivot-pin retainer 56, and a pivot-pin snap support 60 positioned between the first and second pivot-pin retainers 56, 58.

First and second pivot-pin retainers 56, 58 are each formed to include an L-shaped pivot pin slot 62 and include a pivot-pin blocker 65 as shown in FIG. 12. L-shaped pivot pin slots 62 are arranged to receive pivot pin 30 when seat support 14 is coupled to tiltable juvenile vehicle seat 12. L-shaped pivot pin slots 62 include an inlet channel 67 and a retention channel 69 as shown in FIGS. 12-14. Pivot-pin blockers 65 block pivot pin 30 from exiting L-shaped pivot pin slots 62. Pivot-pin snap support 60 is formed to include a C-shaped channel arranged to receive pivot pin 30. Pivot pin 30 is arranged to snap into C-shape channel so that pivot pin 30 is pivotably coupled to pivot-pin snap support 60.

Lock mount 26 includes first lock-pin post 64 and second lock-pin post 66 as shown in FIG. 5. First and second lock-pin posts 64, 66 are formed to include lock-pin channels 68, 70. Each lock-pin channel includes a first pin-receiver channel 72, a second pin-receiver channel 74, a third pin-receiver channel 76, and a lock-pin transfer channel 78 interconnecting channels 72, 74, 76 as shown in FIGS. 19A-22A.

In the illustrative embodiment, second lock-pin post 66 includes a lock-pin access 102 as shown in FIGS. 15-18. Lock-pin access 102 includes deformable flange 104 that extends into an opening formed in lock-pin post 66. Deformable flange 104 pivots when lock pin 32 is inserted into lock-pin access 102 to allow lock pin 32 to pass through lock-pin access 102 as shown in FIG. 16. Deformable flange 104 included in lock-pin access 102 is made of an elastic material and pivots and returns to its initial state after lock pin 32 is inserted fully into lock-pin access 102 to block lock pin 32 from exiting lock-pin access 102 as shown in FIG. 18.

Seat-pivot-and-lock unit 16 includes seat-motion blocker 28, pivot pin 30, lock pin 32, and at least one bias member 34 as shown in FIG. 5. Lock-pin mover 29 of seat-motion blocker 28 is arranged to be moved between an extended seat-anchoring position and a retracted seat-tilting position relative to seat support 14 to free tiltable juvenile vehicle seat 12 for pivotable movement about a seat-pivot axis 80 extending through pivot-pin receiving apertures 42, 44. Pivot pin 30 is configured to pivotably couple tiltable juvenile vehicle seat 12 to seat-pivot-and-lock unit 16 and seat support 14. Lock pin 32 is configured to be received in one of first, second, and third pin-receiver channels 72, 74, 76 to block relative movement between tiltable juvenile vehicle seat 12 and seat support 14. Lock pin 32 is configured to be received in lock-pin transfer channel 78 when seat-motion blocker 28 is in the retracted seat-tilting position to free tiltable juvenile vehicle seat 12 to pivot about seat-pivot axis 80 relative to seat support 14 between an upright orientation and one of two tilt orientations. Bias member 34 illustratively includes two springs 82, 84 configured to bias seat-motion blocker 28 to the extended seat-anchoring position.

Seat-motion blocker 28 includes a blocker body 86, a handle 88 coupled to the blocker body 86, and a lock body 90 as shown in FIGS. 5 and 6. Blocker body 86 includes retainer fingers 92, 92A arranged to receive bias member 34, T-shaped guide slot 94, and lost-motion pivot pin slot 96. Lock body 90 is formed to include a pin channel 98 arranged to receive lock pin 32.

Seat-motion blocker 28 is formed to define lost-motion pivot pin slot 96 that extends through seat-motion blocker 28 as shown in FIG. 5A. Lost-motion pivot pin slot 96 is arranged to receive pivot pin 30 to couple seat-pivot-and-lock unit 16 and seat support 14 to tiltable juvenile vehicle seat 12 as shown in FIG. 5A.

An illustrative process of assembling child restraint 10 is shown for example in FIGS. 6 through 18. Child restraint 10 may be assembled such that an assembler is able to inspect visually seat-pivot-and-lock unit 16 and determine whether springs 82, 84 included in seat-pivot-and-lock unit 16 are installed properly before coupling seat support 14 to tiltable juvenile vehicle seat 12, which may block the assembler's ability to inspect visually that springs 82, 84 are properly coupled to pivot pin 30 and retainer fingers 92, 92A.

In a first step, tiltable juvenile vehicle seat 12, seat-motion blocker 28, and pivot pin 30 are provided as shown in FIG. 6. Tiltable juvenile vehicle seat 12 is oriented to reveal an underside of seat bottom 18 so that ribs 38I, 40I are accessible as shown in FIG. 6. Seat-motion blocker 28 is positioned relative to tiltable juvenile vehicle seat 12 so that T-shaped guide slot 94 formed in seat-motion blocker 28 is aligned with anchor tab 52 extending from the underside of tiltable juvenile vehicle seat 12. Pivot pin 30 is aligned with pivot axis 80 that extends through pivot-pin receiving apertures 42, 44 formed in ribs 38I, 40I.

In a second step, seat-motion blocker 28 is positioned relative to tiltable juvenile vehicle seat 12 such that an upper end of T-shaped guide slot 94 receives anchor tab 52 extending from the underside of tiltable juvenile vehicle seat 12 as shown in FIG. 7. Pivot pin 30 remains aligned with seat-pivot axis 80.

In a third step, seat-motion blocker 28 is moved upwardly relative to tiltable juvenile vehicle seat 12 so that anchor tab 52 is positioned in a lower end of T-shaped guide slot 94 to restrict movement of lock-pin mover 29 of seat-motion blocker 28 relative to tiltable juvenile vehicle seat 12 as shown in FIG. 7. As a result, lost-motion pivot pin slot 96 formed in seat-motion blocker 28 is aligned with pivot-pin receiving apertures 42, 44 formed in first and second ribs 38I, 40I of tiltable juvenile vehicle seat 12.

In a fourth step, pivot pin 30 is inserted through first pivot-pin receiving aperture 42 and into lost-motion pivot pin slot 96 as shown in FIG. 8. Pivot pin 30 extends through pivot-pin receiving apertures 42, 44 and lost-motion pivot pin slot 96 to couple lock-pin mover 29 of seat-motion blocker 28 to tiltable juvenile vehicle seat 12.

In a fifth step, springs 82 and 84 are provided and coupled to pivot pin 30 and lock-pin mover 29 of seat-motion blocker 28 as shown in FIGS. 9 and 10. First spring 82 is coupled to pivot pin 30 between seat-motion blocker 28 and first rib 38I as shown in FIG. 10. First spring 82 is coupled to retainer finger 92 included in blocker body 86 of seat-motion blocker 28. Second spring 84 is coupled to pivot pin 30 between seat-motion blocker 28 and second rib 40I as shown in FIG. 10. Second spring 84 is coupled to retainer finger 92A included in blocker body 86 of seat-motion blocker 28.

Springs 82, 84 can be visually inspected for proper installation during and temporarily after the fifth step. As shown in FIG. 10, during the fifth step, seat support 14 is not coupled to tiltable juvenile vehicle seat 12. As a result, springs 82, 84, pivot pin 30, and retainer fingers 92, 92A may be inspected visually and are tactically accessible. An assembler may verify that springs 82, 84 are coupled properly to pivot pin 30 and retainer fingers 92, 92A.

Springs 82, 84 bias lock-pin mover 29 of seat-motion blocker 28 in the extended seat-anchoring position shown in FIGS. 10 and 19. Seat-motion blocker 28 may be pulled outwardly relative to tiltable juvenile vehicle seat 12 to assume the retracted seat-tilting position shown in FIG. 20. If a caregiver releases seat-motion blocker 28, springs 82, 84 bias seat-motion blocker 28 toward the extended seat-anchoring position so that lock pin 32 is received in one of the first, second, and third pin-receiver channels 72, 74, 76 so that tiltable juvenile vehicle seat 12 is retained in position relative to seat support 14. A retracted end 96A of lost-motion pivot pin slot 96 engages pivot pin 30 when seat-motion blocker 28 is in the extended seat-anchoring position as shown in FIG. 10. An extended end 96B of lost-motion pivot pin slot 96 engages pivot pin 30 when seat-motion blocker 28 is in the retracted seat-tilting position.

In a sixth step, seat support 14 is provided and spaced apart from tiltable juvenile vehicle seat 12 and seat-pivot-and-lock unit 16 as shown in FIG. 11. Seat support 14 is positioned relative to tiltable juvenile vehicle seat 12 so that inlet channels 67 of L-shaped pivot pin slots 62 included in pivot-pin retainers 56, 58 of seat support 14 are aligned with pivot pin 30 as shown in FIGS. 11 and 12. Lock pin 32 is provided and is aligned with lock-pin receiving slots 46, 48 formed in first and second ribs 38I, 40I.

In a seventh step, seat support 14 is moved toward pivot pin 30 to cause pivot pin 30 to be received in inlet channels 67 of L-shaped pivot pin slots 62 as shown in FIG. 13. Seat support 14 is moved downwardly relative to pivot pin 30 so that pivot-pin blockers 65 extending into retention channels 69 of L-shaped pivot pin slots 62 engage pivot pin 30 to cause seat support 14 to be pivotably coupled to pivot pin 30 as shown in FIG. 14. Pivot-pin blockers 65 included in seat support 14 block translation of seat support 14 relative to pivot pin 30 so that pivot pin 30 is blocked from exiting L-shaped pivot pin slots 62 as suggested in FIGS. 5 and 14.

In an eighth step, lock pin 32 is inserted through lock-pin access 102 as shown in FIG. 15. Lock pin 32 is inserted through lock-pin access 102, lock-pin receiving slots 46, 48 formed in ribs 38I, 40I, and pin channel 98 formed in seat-pivot-and-lock unit 16. As a result, lock pin 32 is coupled to lock body 90 of lock-pin mover 29 of seat-motion blocker 28. Lock pin 32 is arranged to move with seat-motion blocker 28 so that lock pin 32 moves in and out of pin-receiver channels 72, 74, 76 to retain tiltable juvenile vehicle seat 12 in position relative to seat support 14.

Lock-pin access 102 included in seat support 14 includes deformable flange 104 that is made of an elastic material and extends into an opening formed in seat support 14 as shown in FIG. 15. Deformable flange 104 pivots when lock pin 32 is inserted into lock-pin access 102 to allow lock pin 32 to pass through lock-pin access 102 as shown in FIG. 16. Deformable flange 104 included in lock-pin access 102 pivots and returns to its initial state after lock pin 32 is inserted fully into lock-pin access 102 to block lock pin 32 from exiting lock-pin access 102 as shown in FIG. 18.

In the illustrative embodiment, lock pin 32 is inserted through lock-pin cutout 50 formed in outer rib 38O as lock pin 32 is inserted through lock-pin access 102 as shown in FIG. 15. Lock-pin cutout 50 aligns with lock-pin access 102 during assembly of child restraint 10. Lock-pin cutout 50 moves out of alignment with lock-pin access 102 after assembly, so that outer rib 38O blocks access to lock-pin access 102. In the illustrative embodiment, end caps 106 are coupled to each end of pivot pin 30.

Child restraint 10 is configured to move between an upright orientation and two tilt orientations as shown in FIGS. 19-22A. As shown in FIGS. 19 and 19A, child restraint 10 is in the upright orientation in which lock pin 32 included in seat-pivot-and-lock unit 16 is received in first channel 72 formed in lock mount 26 to retain tiltable juvenile vehicle seat 12 in position relative to seat support 14.

Seat-pivot-and-lock unit 16 may be pulled outwardly relative to seat support 14 to cause seat-pivot-and-lock unit 16 to be in the retracted seat-tilting position as shown in FIG. 20. Lock pin 32 is moved out of first channel 72 and into an upper end of transfer channel 78 to free tiltable juvenile vehicle seat 12 for pivotable movement relative to seat support 14 when seat-pivot-and-lock unit 16 is in the extended position as shown in FIG. 20A. Tiltable juvenile vehicle seat 12 may be pivoted clockwise about seat-pivot axis 80 relative to seat support 14 to assume one of two tilt orientations when seat-pivot-and-lock unit 16 is in the retracted seat-tilting position.

While seat-pivot-and-lock unit 16 is in the retracted seat-tilting position, tiltable juvenile vehicle seat 12 may be pivoted clockwise about seat-pivot axis 80 relative to seat support 14 to assume a second tilt orientation as shown in FIG. 21. Lock pin 32 is received in a lower end of lock-pin transfer channel 78 as a result of tiltable juvenile vehicle seat 12 being pivoted about seat-pivot axis 80 relative to seat support 14 to assume the second tilt orientation as shown in FIG. 21A.

Seat-pivot-and-lock unit 16 is released and assumes the extended seat-anchoring position to lock tiltable juvenile vehicle seat 12 in place relative to seat support 14 as shown in FIG. 22. In the extended seat-anchoring position, lock pin 32 is received in one of the first, second, and third pin-receiver channel 72, 74, 76 formed in seat support 14. Lock pin 32 is received in third pin-receiver channel 76 to block relative movement between tiltable juvenile vehicle seat 12 and seat support 14 to retain child restraint 10 in the second tilt orientation as shown in FIG. 22A.

The invention claimed is:

1. A method of assembling a child restraint comprises the steps of
    mating a lock-pin mover of a slidable tilt controller on an underside of a tiltable juvenile vehicle seat for sliding movement between an extended seat-anchoring position and a retracted seat-tilting position,
    coupling a mover-biasing spring to the tiltable juvenile vehicle seat and to the lock-pin mover to yieldably urge the lock-pin mover to the extended seat-anchoring position before the lock-pin mover is pivotability coupled to a seat support adapted to set on a passenger vehicle seat to position the tiltable juvenile vehicle seat on the passenger vehicle seat so that visual inspection of proper coupling of the mover-biasing spring to the tiltable juvenile vehicle seat and to the lock-pin mover by an assembly technician is possible, and
    mounting the lock-pin mover on a seat support adapted to set on a passenger vehicle seat after the coupling step to support the lock-pin mover and the tiltable juvenile vehicle seat for pivotable movement as a unit relative to the seat support about a seat-pivot axis and locate the mover-biasing spring in a hidden position between the tiltable juvenile vehicle seat and the seat support that is not visible to the assembly technician so as to facilitate tilting movement of the juvenile vehicle seat relative to the seat-support between at least two different tilted positions when the lock-pin mover is moved by a caregiver against a biasing force provided by the mover-biasing spring to the retracted seat-tilting position.

2. The method of claim 1, further comprising the step of passing a lock pin through an aperture formed in the juvenile vehicle seat after the mating step to mount the lock pin on the lock-pin mover for movement therewith relative to the juvenile vehicle seat when the lock-pin mover is moved by a caregiver to assume the retracted seat-tilting position so that the lock pin can be aligned with and extended into a selected one of a first lock-pin-receiving channel section formed in the seat support and associated with a first tilt angle of the juvenile vehicle seat relative to the seat support and a different second lock-pin-receiving channel section formed in the seat support and associated with a different second tilt angle of the juvenile vehicle seat relative to the seat support.

3. The method of claim 2, wherein the seat support includes pin-removal blocker means for blocking removal of the lock pin from the lock-pin mover through the aperture after the passing step.

4. The method of claim 3, wherein the seat support includes a panel formed to include the aperture and the pin-removal blocker means includes a deformable flange made of an elastic material and coupled to the panel for movement in a direction toward the lock-pin mover during the passing step to allow movement of the lock pin in a first direction to engage the lock-pin mover and block movement of the lock pin in an opposite second direction through the aperture after the passing step.

5. The method of claim 1, wherein the lock-pin mover has a grip handle at a first end thereof, a lock body at an opposite second end thereof, and a middle portion formed to include a lost-motion pivot pin slot, and the coupling step includes the steps of placing the lock body in a space formed between rearwardly extending first and second inner ribs included in the juvenile vehicle seat to align the lost-motion pivot pin slot with a first aperture formed in the first inner rib and a second aperture formed in the second inner rib and passing a pivot pin, in sequence through the first aperture, the lost-motion pivot pin slot, and the second aperture to establish the seat-pivot axis.

6. The method of claim 1, further comprising the step of moving the lock-pin mover toward the tiltable juvenile vehicle seat to cause a first end of a T-shaped guide slot formed in the lock-pin mover to receive an anchor tab included in the tiltable juvenile vehicle seat.

7. The method of claim 6, wherein the aligning step includes the steps of sliding the lock-pin mover relative to the tiltable juvenile vehicle seat to cause the anchor tab to move from the first end of the T-shaped guide slot toward a second end of the T-shaped guide slot.

8. The method of claim 1, wherein the pivot mount of the seat support includes a pivot-pin retainer formed to include an L-shaped pivot pin slot and the method further comprises the step of aligning an inlet channel of the L-shaped pivot pin slot of the pivot mount with the pivot pin.

9. The method of claim 8, wherein the L-shaped pivot pin slot includes a retention channel, the pivot mount includes a pivot-pin blocker arranged to extend into the retention channel, and the moving step comprises the step of sliding the seat support relative to the tiltable juvenile vehicle seat to cause the pivot-pin blocker to engage the pivot pin and block translation of the seat support relative to the pivot pin.

10. The method of claim 1, wherein the seat support includes a pivot-pin snap support formed to include a C-shaped channel and the moving step causes the pivot pin to be received in the C-shaped channel to couple pivotably the pivot pin to the pivot-pin snap support.

11. The method of claim 1, wherein the lock mount included in the seat support includes a deformable flange made of an elastic material and the inserting step causes the deformable flange to pivot to allow the lock pin to pass through the lock mount.

12. A method of assembling a child restraint, the method comprising the steps of
providing a child restraint comprising a tiltable juvenile vehicle seat including a seat bottom formed to include a pivot-pin receiving aperture and a lock-pin receiving slot, a seat support including a pivot mount and a lock mount, and a seat-pivot-and-lock unit including a pivot pin, a first spring, a lock pin, and a lock-pin mover including a first retainer finger and a lock body,
aligning a lost-motion pivot pin slot formed in the lock-pin mover with the pivot-pin receiving aperture formed in a rib included in the seat bottom of the tiltable juvenile vehicle seat,
inserting the pivot pin through the pivot-pin receiving aperture formed in the rib and the lost-motion pivot pin slot formed in the lock-pin mover to couple the lock-pin mover of the seat-pivot-and-lock unit to the tiltable juvenile vehicle seat,
coupling the first spring between the pivot pin and the first retainer finger included in the lock-pin mover to bias a seat-motion blocker toward a retracted position in which a retracted end of the lost-motion pivot pin slot engages the pivot pin,
moving the seat support relative to the tiltable juvenile vehicle seat to cause the pivot mount included in the seat support to receive the pivot pin to couple pivotably the seat support to the tiltable juvenile vehicle seat and to the lock-pin mover, and
inserting the lock pin through the lock-pin receiving slot formed in the rib included in the tiltable juvenile vehicle seat, the lock mount included in the seat support, and the lock body included in the seat-motion blocker to couple the tiltable juvenile vehicle seat to the seat support and to block selectively movement of the tiltable juvenile vehicle seat relative to the seat support to retain the tiltable juvenile vehicle seat in one of an upright orientation and one of two tilt orientations arrangements.

13. The method of claim 12, further comprising viewing the first spring to determine that the first spring is coupled properly between the pivot pin and the first retainer finger.

14. The method of claim 13, further comprising coupling a second spring between the pivot pin and a second retainer finger included in the lock-pin mover to locate the lock-pin mover between the first and second springs.

15. The method of claim 13, wherein coupling the first spring between the pivot pin and the first retainer finger causes the first spring to be located between the lock-pin mover and the rib included in the tiltable juvenile vehicle seat.

16. A method of assembling a child restraint, the method comprising the steps of
aligning a lost-motion pivot pin slot formed in a lock-pin mover included in a seat-pivot-and-lock unit with a pivot-pin receiving aperture formed in a rib included in a tiltable juvenile vehicle seat,
inserting a pivot pin of the seat-pivot-and-lock unit through the pivot-pin receiving aperture and the lost-motion pivot pin slot to couple the lock-pin mover of the seat-pivot-and-lock unit to the tiltable juvenile vehicle seat,
coupling a first spring between the pivot pin and a first retainer finger included in the lock-pin mover to bias the lock-pin mover toward an extended seat-anchoring position in which an extended end of the lost-motion pivot pin slot engages the pivot pin,
moving a seat support relative to the tiltable juvenile vehicle seat to cause a pivot mount included in the seat support to receive the pivot pin to pivotably couple the seat support to the tiltable juvenile vehicle seat and to the lock-pin mover, and
inserting a lock pin through a lock-pin receiving slot formed in the rib included in the tiltable juvenile vehicle seat, a lock mount included in the seat support, and a lock body included in the lock-pin mover to couple the tiltable juvenile vehicle seat to the seat support and to block selectively movement of the tiltable juvenile vehicle seat relative to the seat support to retain the tiltable juvenile vehicle seat in one of an upright orientation and one of two tilt orientations.

17. The method of claim 16, further comprising the step of moving the lock-pin mover toward the tiltable juvenile vehicle seat to cause an upper end of a T-shaped guide slot formed in the lock-pin mover to receive an anchor tab included in the tiltable juvenile vehicle seat.

18. The method of claim 17, wherein the aligning step includes the step of sliding the lock-pin mover relative to the tiltable juvenile vehicle seat to cause the anchor tab to move from the upper end of the T-shaped guide slot toward a lower end of the T-shaped guide slot.

19. The method of claim 16, wherein the pivot mount of the seat support includes a pivot-pin retainer formed to define an L-shaped pivot pin slot and the method further includes aligning an inlet channel of the L-shaped pivot pin slot of the pivot mount with the pivot pin.

20. The method of claim 19, wherein the L-shaped pivot pin slot includes a retention channel, the pivot mount includes a pivot-pin blocker that extends into the retention channel, and the moving step includes the step of sliding the seat support relative to the tiltable juvenile vehicle seat to cause the pivot-pin blocker to engage the pivot pin and block translation of the seat support relative to the pivot pin.

21. The method of claim 16, further comprising the step of coupling a second spring between the pivot pin and a second retainer finger included in the seat-motion blocker to locate the lock-pin mover between the first and second springs.

* * * * *